US011500103B2

(12) United States Patent
Ahn et al.

(10) Patent No.: US 11,500,103 B2
(45) Date of Patent: Nov. 15, 2022

(54) MOBILE TERMINAL

(71) Applicant: LG ELECTRONICS INC., Seoul (KR)

(72) Inventors: Yehan Ahn, Seoul (KR); Minho Kim, Seoul (KR); Hoyoung Kim, Seoul (KR); Minwoo Song, Seoul (KR); Jihye Yu, Seoul (KR); Dongju Lee, Seoul (KR); Jieun Lee, Seoul (KR); Sangkuk Jeon, Seoul (KR); Dongchul Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 556 days.

(21) Appl. No.: 16/661,215

(22) Filed: Oct. 23, 2019

(65) Prior Publication Data

US 2020/0124733 A1   Apr. 23, 2020

Related U.S. Application Data

(60) Provisional application No. 62/807,251, filed on Feb. 19, 2019.

(30) Foreign Application Priority Data

Oct. 23, 2018  (WO) ................ PCT/KR2018/012562
Feb. 13, 2019  (WO) ................ PCT/KR2019/001775
Jul. 30, 2019  (KR) ........................ 10-2019-0092155

(51) Int. Cl.
*G01S 17/89* (2020.01)
*G01S 17/36* (2006.01)
(Continued)

(52) U.S. Cl.
CPC ............ *G01S 17/89* (2013.01); *G01S 7/4865* (2013.01); *G01S 7/4915* (2013.01); *G01S 17/36* (2013.01);
(Continued)

(58) Field of Classification Search
CPC ........ G01S 17/89; G01S 17/36; G01S 7/4865; G01S 7/4915; H04N 13/254; H04N 13/271
(Continued)

(56) References Cited

U.S. PATENT DOCUMENTS

2008/0168403 A1*  7/2008  Westerman ........... G06F 3/0488
                                                     715/863
2015/0324001 A1*  11/2015  Yanai ........................ G06T 7/70
                                                     345/156
(Continued)

FOREIGN PATENT DOCUMENTS

KR   10-2013-0100524 A   9/2013
KR   10-2013-0138225 A   12/2013
(Continued)

*Primary Examiner* — Nguyen T Truong
(74) *Attorney, Agent, or Firm* — Birch, Stewart, Kolasch & Birch, LLP

(57) ABSTRACT

A mobile terminal including a display configured to display a rotatable graphic interface; a Time of Flight (TOF) camera configured to obtain a depth image of an object; and a controller configured to control the TOF camera to enter a rotation detection mode based on the object included the depth image, obtain a relative rotation amount of a plurality of specific points of the object included in the depth image, and rotate the graphic interface on the display based on the obtained relative rotation amount.

21 Claims, 27 Drawing Sheets

(51) Int. Cl.
*H04N 13/254* (2018.01)
*H04N 13/271* (2018.01)
*G01S 7/4915* (2020.01)
*G01S 7/4865* (2020.01)

(52) U.S. Cl.
CPC ......... *H04N 13/254* (2018.05); *H04N 13/271* (2018.05); *G06T 2207/10028* (2013.01)

(58) Field of Classification Search
USPC ....................................................... 356/4.01
See application file for complete search history.

(56) References Cited

U.S. PATENT DOCUMENTS

| | | |
|---|---|---|
| 2017/0090584 A1 | 3/2017 | Tans et al. |
| 2017/0244922 A1 | 8/2017 | Dielacher et al. |
| 2017/0272651 A1 | 9/2017 | Mathy et al. |
| 2017/0324891 A1 | 11/2017 | Mark et al. |

FOREIGN PATENT DOCUMENTS

| | | |
|---|---|---|
| KR | 10-2015-0022673 A | 3/2015 |
| KR | 10-2016-0034430 A | 3/2016 |
| KR | 10-1660215 B1 | 9/2016 |
| WO | WO 2018/026142 A1 | 2/2018 |

* cited by examiner (a)

(b)

(a)　　　(b)　　　(c)

(a)

(b)

(d)

(c)

(b)

(a)

MOBILE TERMINAL

CROSS-REFERENCE TO RELATED APPLICATIONS

Pursuant to 35 U.S.C. § 119(a), this application claims the benefit of an earlier filing date and priority to Korean Application No. 10-2019-0092155 filed in the Republic of Korea on Jul. 30, 2019, and claims the priority benefit under 35 U.S.C. § 119(e) to U.S. Provisional Application No. 62/807,251 filed on Feb. 19, 2019, and under 35 U.S.C. § 119(a) to PCT Application Nos. PCT/KR2019/001775 filed on Feb. 13, 2019 and PCT/KR2018/012562 filed on Oct. 23, 2018, all of which are hereby expressly incorporated by reference into the present application.

BACKGROUND OF THE INVENTION

Field of the Invention

The present disclosure relates to a mobile terminal. More specifically, the present disclosure may be applied to a technical field of detecting a rotation amount of an object using a TOF camera and correspondingly rotating a graphic interface.

Discussion of the Related Art

Terminals may be divided into mobile terminals or portable terminals and fixed terminals or stationary terminals, depending on their mobility. Mobile terminals may be categorized into portable terminals or handheld terminals and vehicle mounted terminals depending on the user's direct portability.

The functions of mobile terminals are diversifying. For example, the functions may include data and voice communication, imaging and video shooting through camera, voice recording, music file playback through speaker system, and outputting of an image or video on the display. Some terminals have added electronic game play functions or further perform multimedia player functions. In particular, modern mobile terminals may receive multicast signals that provide visual content such as broadcast, video, and television programs.

With development of three-dimensional depth camera technology, the mobile terminal has a user interface (UI) that detects the motion or gesture of the user based on the three-dimensional vision technology to control the mobile terminal. The three-dimensional vision-based UI may complement existing two-dimensional touch-based UI and be applied to various applications. For example, in Augmented Reality (AR) applications, the three-dimensional vision-based UI can control objects in a three dimension. Even when the device is in a position where the user cannot touch the device, the three-dimensional vision-based UI allows the user to control the device. When the user's hand is dirty or wearing gloves to disable the touch control, the three-dimensional vision-based UI allows the user to control the device. Accordingly, the three-dimensional vision-based gesture recognition technology is in the spotlight.

SUMMARY OF THE INVENTION

One object of the present disclosure is to provide a UI that detects a rotation amount of an object using a TOF camera and correspondingly rotates a graphic interface.

A first aspect of the present disclosure provides a mobile terminal including a display for providing a rotatable graphic interface; a Time of Flight (TOF) camera to image an object to obtain a depth image; and a controller connected to the display and the TOF camera, wherein the controller is configured to: when the TOF camera enters a rotation detection mode, obtain a relative rotation amount of a plurality of specific points included in the depth image; and control the display to rotate the graphic interface based on the relative rotation amount.

Effects of the present disclosure are as follows but are not limited thereto.

In accordance with the present disclosure, the TOF camera can obtain the rotation amount of an object in a specific mode state. Further, the rotation of the graphic interface can be controlled based on the rotation amount of the object obtained using the TOF camera.

In addition to the effects as described above, specific effects of the present disclosure are described together with specific details for carrying out the present disclosure.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION OF THE EMBODIMENTS

Figure 1A:
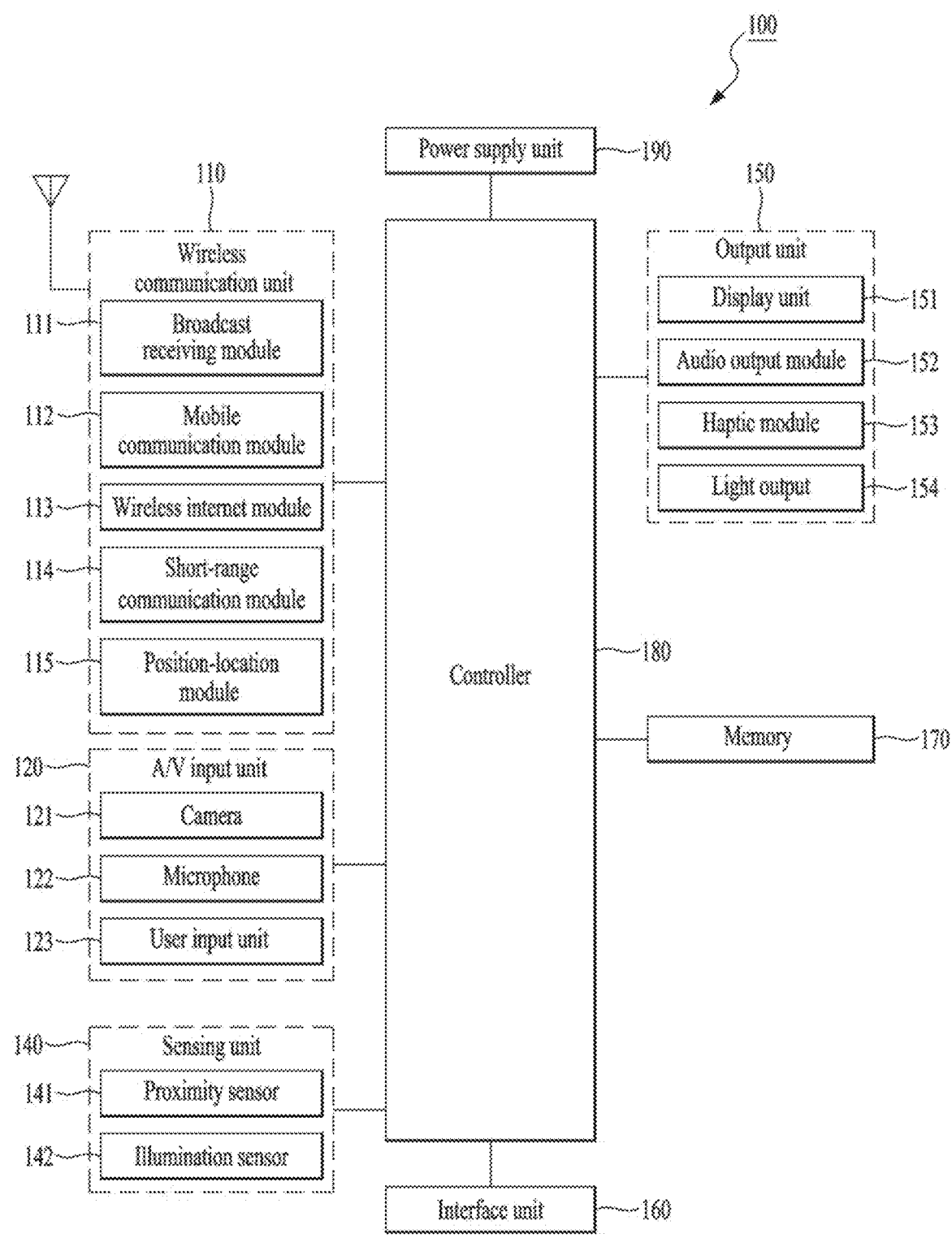
FIG. 1a is a block diagram illustrating a mobile terminal in accordance with the present disclosure.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, a suffix such as "module" and "unit" may be used to refer to elements or components. Use of such a suffix herein is merely intended to facilitate description of the specification, and the suffix itself is not intended to give any special meaning or function.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
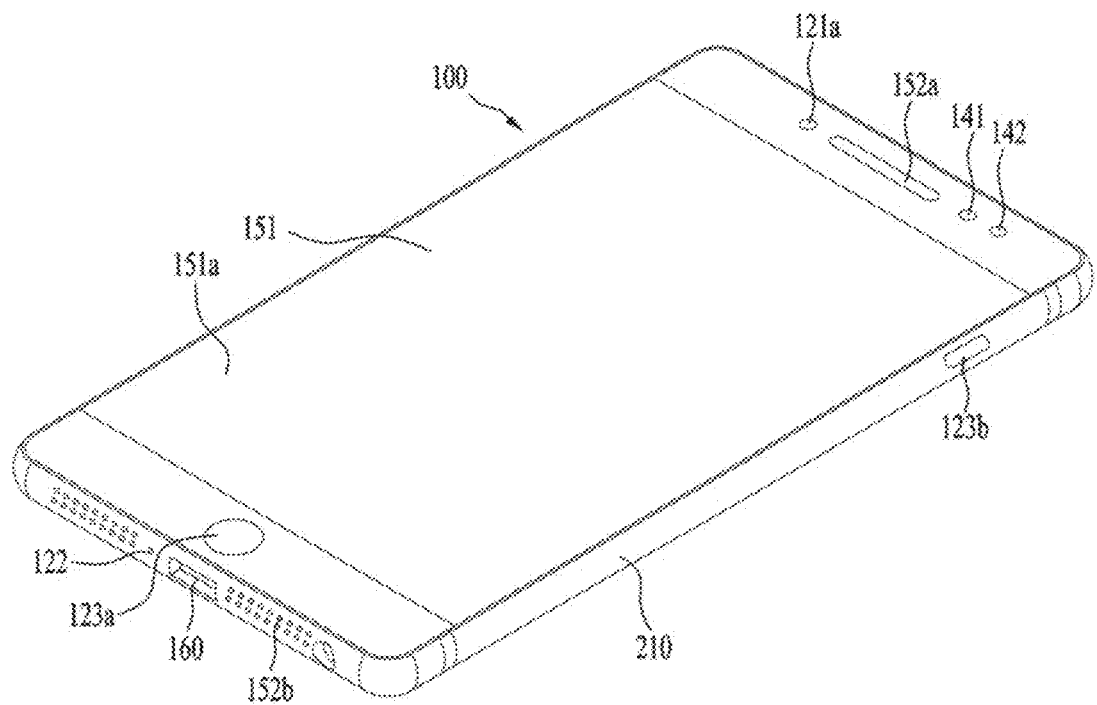
FIG. 1b and FIG. 1c are conceptual views of examples of mobile terminals in accordance with the present disclosure when viewed in different directions.
Figure 1C:
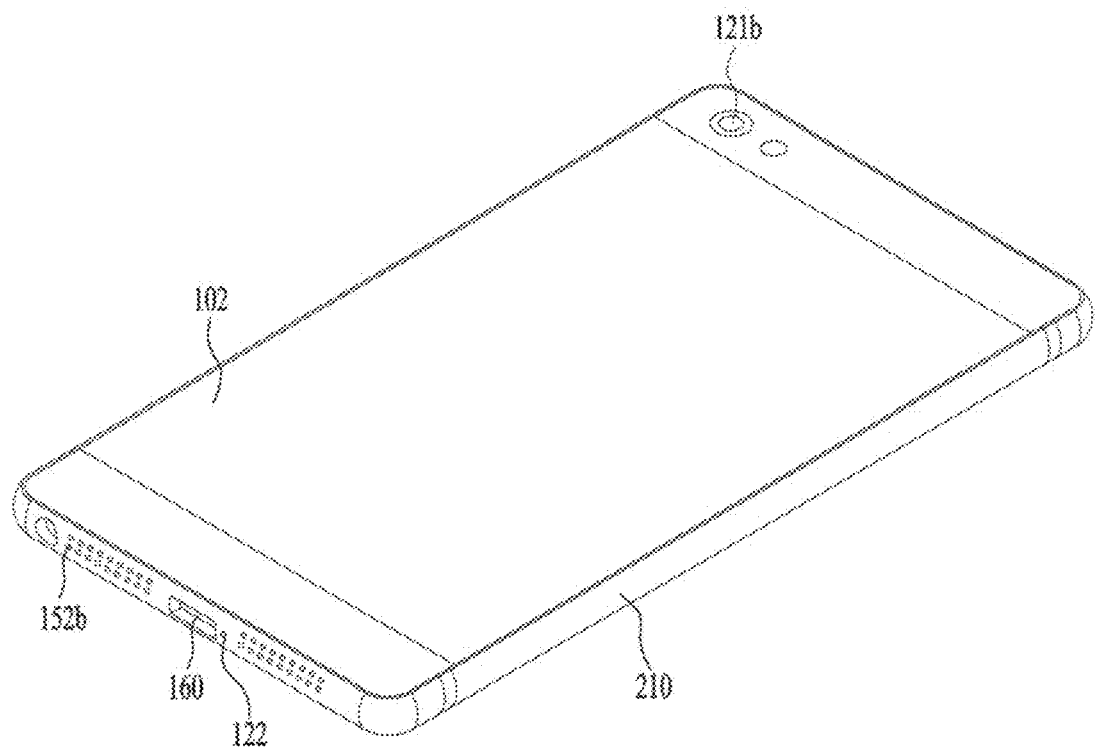

Reference is now made to FIGS. 1a-1c, where FIG. 1a is a block diagram of a mobile terminal in accordance with the present disclosure. FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components in FIG. 1a is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position-location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1*a*. Moreover, the controller 180 can be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

The input unit 120 is configured for inputting image information or signal, audio information or signal, data, or information input from the user. For input of image information, the mobile terminal 100 may include one or a plurality of cameras 121.

The camera 121 may be a part of the mobile terminal 100 according to the present disclosure, or may be a component that includes the mobile terminal 100. That is, the mobile terminal 100 and the camera 121 according to the present disclosure may include at least some common features or components.

The camera 121 processes an image frame such as a still image or a moving image obtained by an image sensor in a video call mode or an imaging mode. The processed image frame may be displayed on the display 151 or stored in the memory 170. In one example, a plurality of camera 121 of the mobile terminal 100 may be arranged to form a matrix structure. Using the camera 121 having the matrix structure as described above, the mobile terminal 100 may receive a plurality of image information having various angles or focal points. Further, a plurality of camera 121 may be arranged to have a stereo structure to obtain a left image and a right image for implementing a stereoscopic image.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate. The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160. It will be described for the mobile terminal as shown in FIGS. 1b and 1c. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1a). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 2:
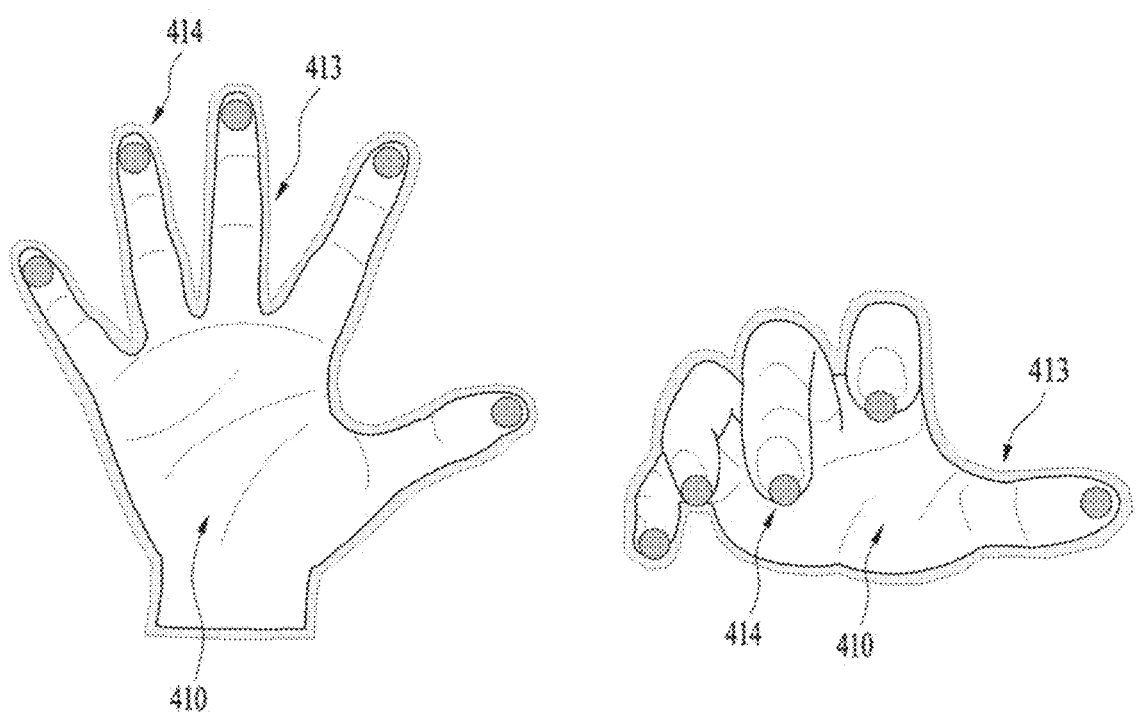
FIG. 2 illustrates a method of recognizing a user's finger using a depth image acquired by a depth camera in a prior art.
Figure 2:
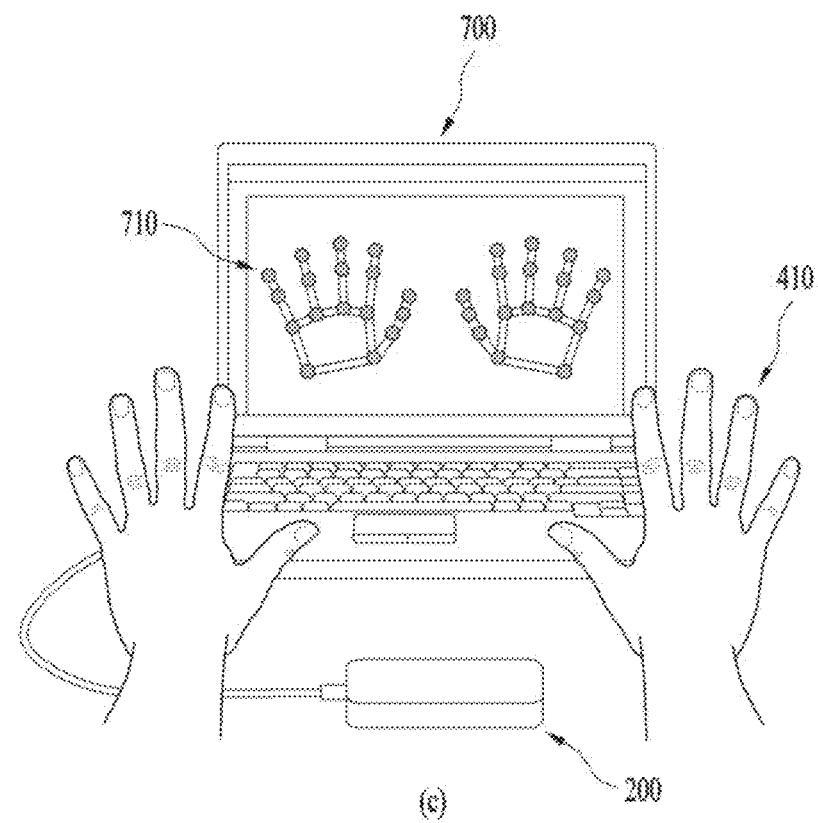

Next, FIG. 2 illustrates a method of recognizing a user's finger using a depth image acquired by a depth camera in a background art. In order for the mobile terminal to implement a vision-based interface using a depth camera, the mobile terminal should extract an image portion corresponding to the user's hand 410 from an entire depth image quickly and accurately and should track a finger 414 accurately and quickly.

Currently, most of finger tracking algorithms use an edge 413 of the hand 410 to obtain a position of the finger 414, as shown in FIG. 2a. Since this approach tracks the finger 414 with reference to the edge 413 of the hand 410, there is a problem that a shape of the hand 410 must be obtained from the palm or the back of the hand. Thus, in an approach that provides UI/UX based on the gesture of the hand 410, a camera 200 is always installed at a position where the palm or the back of the hand is visible thereto as shown in FIG. 2c, and then the hand 410 is imaged as shown in FIG. 2a.

However, it may be difficult to track the finger 414 when an edge of the finger facing the camera is unclear as shown in FIG. 2b. Further, an approach of tracking a shortest distance point using a depth camera is not suitable for tracking a plurality of fingers 414. Therefore, a new technique is needed to track the finger 414 using the depth camera.

Figure 3:
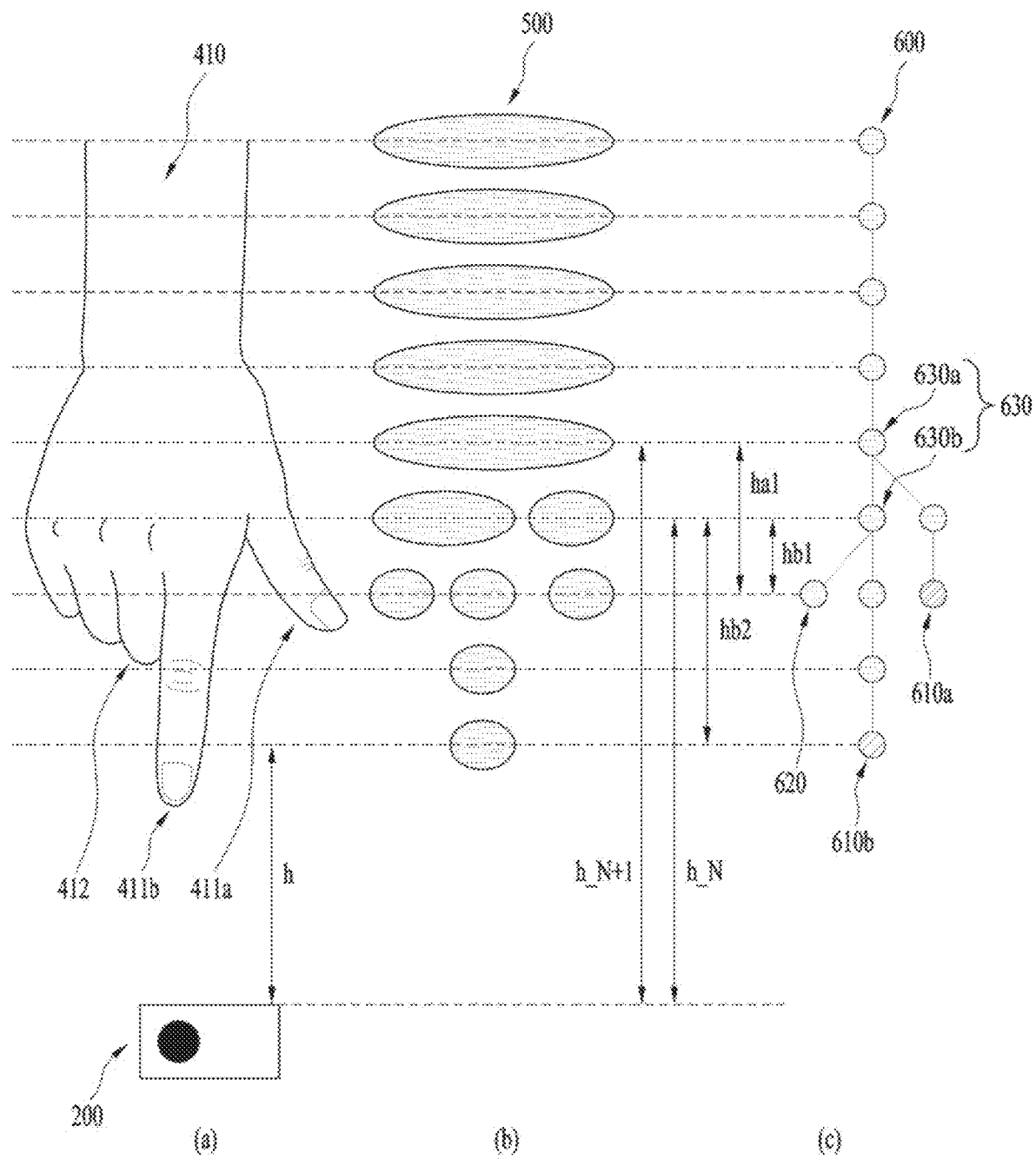
FIG. 3 is a diagram illustrating a method by which a mobile terminal recognizes a point that the user's hand points to using a depth camera according to an embodiment of the present disclosure.

Hereinafter, an algorithm by which a mobile terminal tracks a finger quickly and accurately using a depth camera according to an embodiment of the present disclosure will be described. In particular, FIG. 3 is a diagram illustrating a method by which a mobile terminal recognizes a point that the user's hand 410 points to using a depth camera 200 according to an embodiment of the present disclosure.

In more detail, the mobile terminal needs to quickly and accurately track the target fingers of the user's hand 410 and target points 411a and 411b of the corresponding fingers in order to interact with the user. Further, even when a non-target finger 412 protrudes from the user's hand 410 toward the depth camera, the mobile terminal should not track the non-target finger 412.

Next, FIG. 3a shows an embodiment where the user's hand 410 is facing the depth camera 200. In addition, FIG. 3b shows segments 500 obtained based on a distance h to the depth camera 200 in the depth image after the depth camera 200 captures the user's hand 410 in FIG. 3a. Further, FIG. 3c shows a segment tree 600 implemented using corresponding reference distances of the segments 500 in FIG. 3b and inter-segments relationship.

The mobile terminal can extract the target points 411a and 411b from the depth image of the user's hand 410 using the segment tree 600. Specifically referring to the segment tree 600 in FIG. 3c, the segment tree 600 may include at least one node 630. The at least one node 630 may be a specific segment including a plurality of segments corresponding to a neighbor thereto. That is, when a segment corresponding to a (N+1)-th reference distance $h\_N+1$ includes a plurality of segments corresponding to a N-th reference distance $h\_N$, the segment corresponding to the (N+1)-th reference distance h_N+1 may be a specific segment and may correspond to a first node 630a in the segment tree 600.

The target points 411a and 411b of the user's hand 410 may correspond to valid ends 610a and 610b spaced by a predefined distance or greater from the node (=specific segment 630) of the segment tree 600 toward the depth camera 200. More specifically, the target points 411a and 411b may correspond to segments spaced by a predefined distance or greater from a reference distance point corresponding to the specific segment toward the mobile terminal or the depth camera 200.

As shown, a first valid end 610a is connected to a first node 630a, and a distance ha1 between the first valid end 610a and the first node 630a is greater than or equal to a predefined distance. Thus, the first valid end 610a may correspond to the target first point 411a of the user's hand.

In addition, the second valid end 610b is connected to the second node 630b, and a distance ha2 between the second node 630b and second valid end 610b is greater than or equal to a predefined distance. Thus, the second valid end 610b may correspond to the target second point 411b of the user's hand 410.

When a distance between a certain end of the segment tree 600 and the node 630 is smaller than the predefined distance, the certain end is identified as an invalid end 620. The invalid end 620 may correspond to a non-target point 412 of the user's hand 410. Specifically, the invalid end 620 is connected with the second node 630b, and a distance hb1 between the second node 630b and invalid end 620 is smaller than the predefined distance. Thus, the invalid end 620 may correspond to the non-target point 412 of the user's hand 410.

That is, whether a certain end of the segment tree is valid or invalid may be identified based on whether a distance between the certain end and the connected node thereto is greater than or equal to the predefined distance. Thus, in accordance with the present disclosure, a finger such as a thumb having a different node depth from a node depth of an index finger may act as a target finger which may be tracked. Thus, the present disclosure has an advantage of accurately tracking the target points of multiple of fingers.

Figure 4:
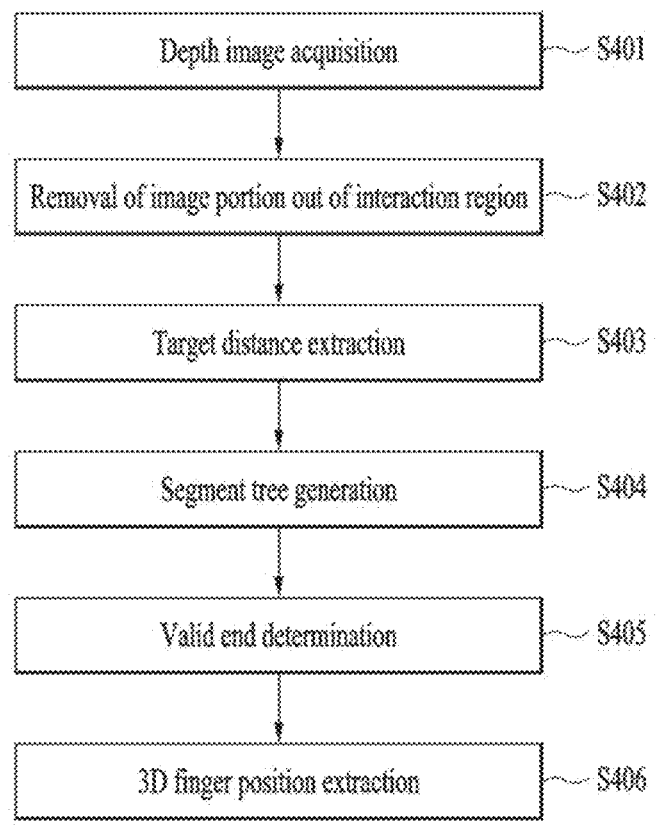
FIG. 4 is a flow chart to illustrate FIG. 3.

In a following description, a method by which the mobile terminal tracks the user's finger using the depth camera 200 is described in detail. In particular, FIG. 4 is a flow chart to illustrate FIG. 3.

As shown, the mobile terminal uses a depth camera to obtain a depth image to track the user's finger S401. The mobile terminal sets an interaction region in the depth image to identify the user's hand and removes an image portion outside the interaction region from the depth image S402. In addition, the interaction region can be set to be within a first predefined distance from the mobile terminal. This will be described in detail with reference to FIG. 5 below.

The mobile terminal can extract a target distance of an object based on a pixel having a distance value closest to the mobile terminal in the depth image S403. The target distance can act as a starting reference distance used for acquiring segments based on distances to the mobile terminal from the depth image. This will be described in detail with reference to FIG. 6.

The depth camera acquires segments corresponding to distances to the depth camera from the depth image. Further, the depth camera can generate a segment tree using an inter-segments relationship S404. The segment tree may be implemented using inter-segments including relationship between the segments obtained based on the distances to the mobile terminal. This will be described in detail with reference to FIGS. 7 to 11.

Further, the mobile terminal can determine whether a certain end is the valid end based on a distance between the certain end and the node in the segment tree S405. In more detail, the mobile terminal identifies a specific segment corresponding to the node in the segment tree. Then, when a certain end is spaced by a second predefined distance or greater from the specific segment toward the mobile terminal, the certain end can be determined as the valid end. This will be described in detail with reference to FIG. 12 and FIG. 13

In addition, the mobile terminal extracts the target point and depth (=3D Finger Position) corresponding to the determined valid end S406. The mobile terminal also extracts a position of at least one target point corresponding to the valid end, and provides a video feedback corresponding to the extracted position on a display. In this regard, the method of extracting the position of the target point will be described using FIGS. 15 and 16.

In order for the mobile terminal to track the user's finger, the mobile terminal may include a memory to store at least one command, a depth camera to capture an object to obtain a depth image, a display that outputs video feedback corresponding to the object captured by the depth camera based on at least one command stored in the memory, and a controller connected to the display, the memory, and the depth camera. The controller controls the depth camera to track the object in response to the object being within a first predefined distance from the mobile terminal, according to at least one command stored in the memory, and obtains at least one segment based on the distance to the mobile terminal from the depth image, according to at least one command stored in the memory, and controls the display to output at least one target point spaced by a second predefined distance or greater from a position corresponding to the specific segment toward the mobile terminal according to at least one command stored in the memory.

Figures 5, 6:
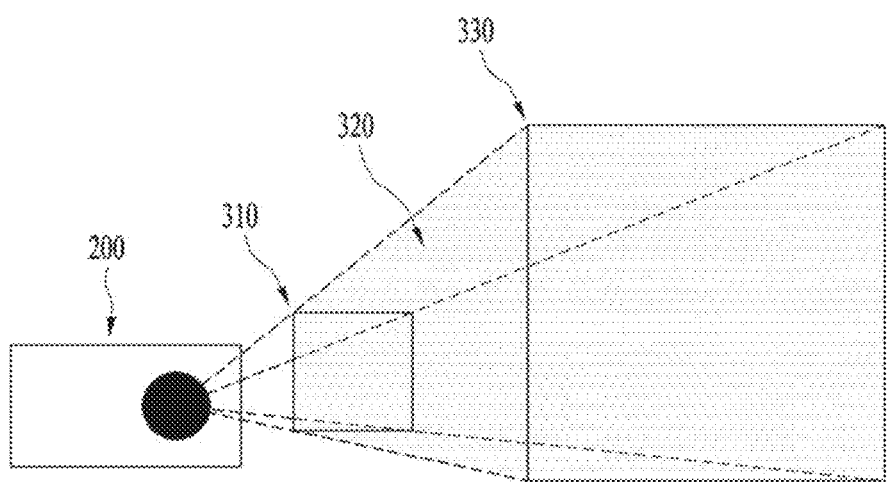
FIG. 5 illustrates an interaction region in FIG. 4.
FIG. 6 illustrates a depth image obtained in the interaction region in FIG. 5.

Next, FIG. 5 shows the interaction region in FIG. 4, and FIG. 6 illustrates the depth image obtained in the interaction region in FIG. 5. The depth camera 200 can extract depth data of each pixel and extract an object within a specific distance using the extracted depth data.

As used herein, the interaction region 320 may correspond to a region within a first predefined distance (=maximum perceiving distance=Max distance) 330, as shown in FIG. 5. In some cases, the interaction region 320 may be a region between a minimum perceiving distance 310 at which the depth camera can recognize an object and the first predefined distance 330.

The mobile terminal can only track tracking an object that is present in the interaction region 320. Since the user positions his hand toward the mobile terminal and interacts with the mobile terminal using the motion of the hand, the object entering the interaction region 320 may be the user's hand. The mobile terminal tracks the object that may be the user's hand. Further, the mobile terminal removes pixel values of pixels except for pixels having pixel values corresponding to the interaction region 320 in the acquired depth image.

In FIG. 6, a pixel 321 having a value of 0 corresponds to a pixel having a pixel value not corresponding to the interaction region 320 and corresponds to a pixel for which the pixel value is removed. Further, the pixel 322 may be a pixel having a pixel value corresponding to the interaction region 320. That is, the pixel 322 having the pixel value may be a pixel having a pixel value corresponding to the first reference distance 330 or smaller.

In addition, the mobile terminal is designed to start tracking when an object enters the interaction region 320. In other words, when an object does not enter the interaction region 320 and all pixel values are set to 0, the mobile terminal does not perform the tracking as described below, thereby increasing energy and data efficiency.

When an object enters the interaction region 320, the mobile terminal can determine the shortest distance in the acquired depth image. The shortest distance may be a distance corresponding to the minimum pixel value except for 0 in FIG. 6. The determined shortest distance may be used to form an object segment tree when the object enters the interaction region 320. The method for forming the segment tree will be described below.

Figure 7:
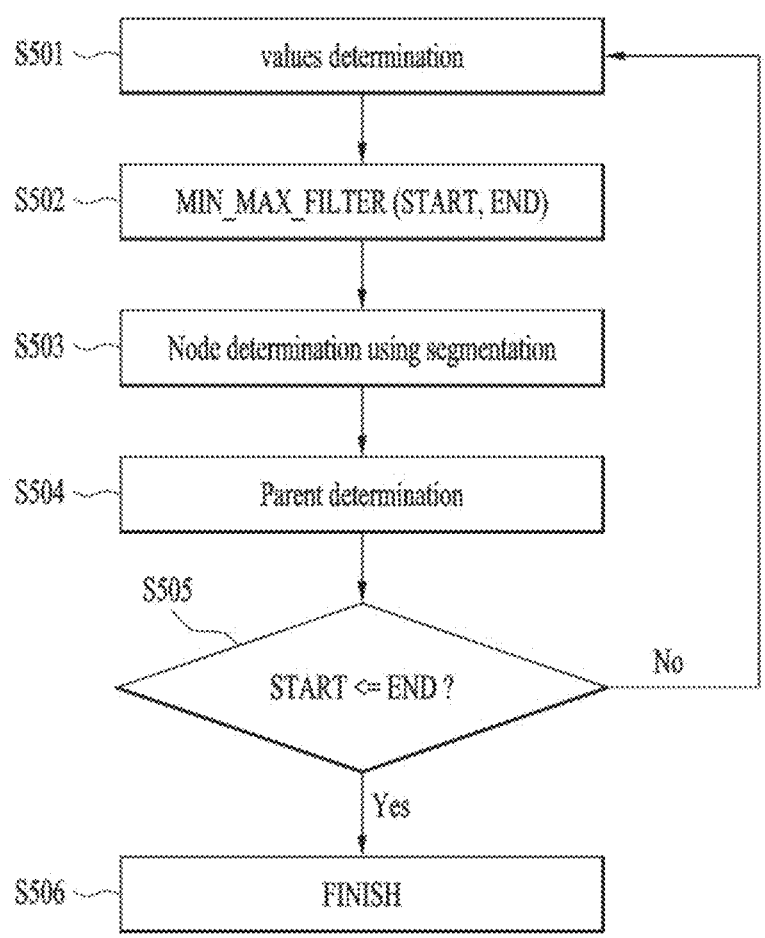
FIG. 7 is a flow chart illustrating a method of implementing a segment tree corresponding to the user's hand in FIG. 4.
Figure 8:
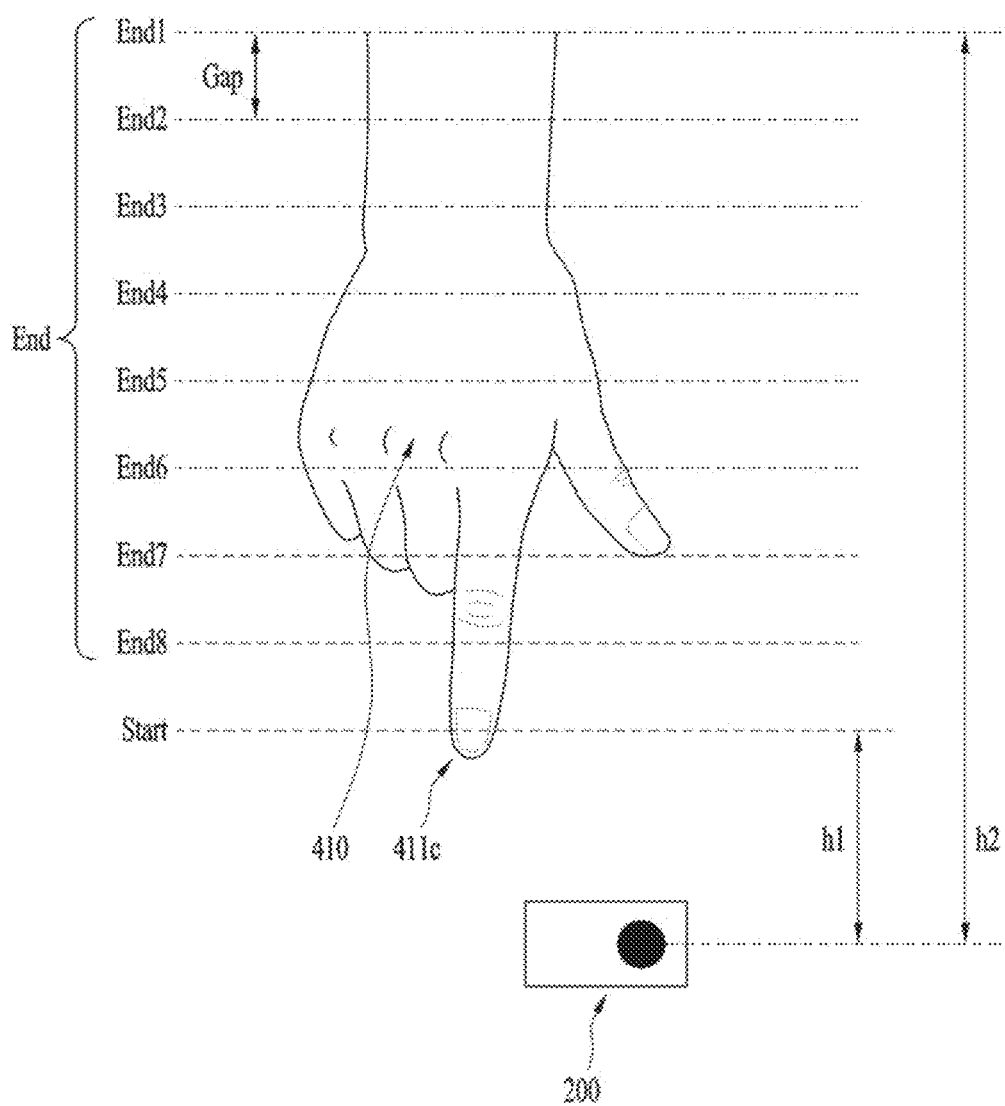
FIG. 8 to FIG. 11 are diagrams describing FIG. 7.
Figure 9:
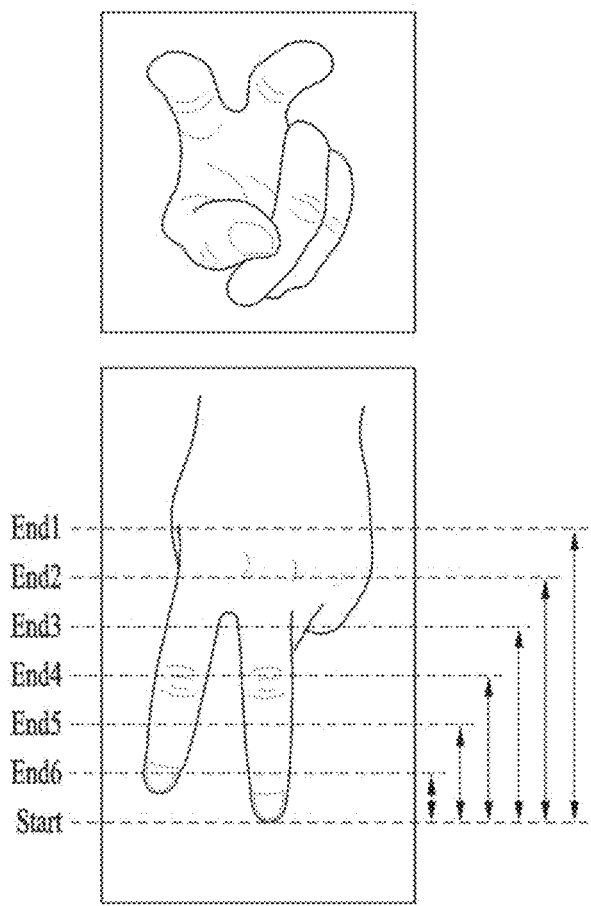
Figure 9:
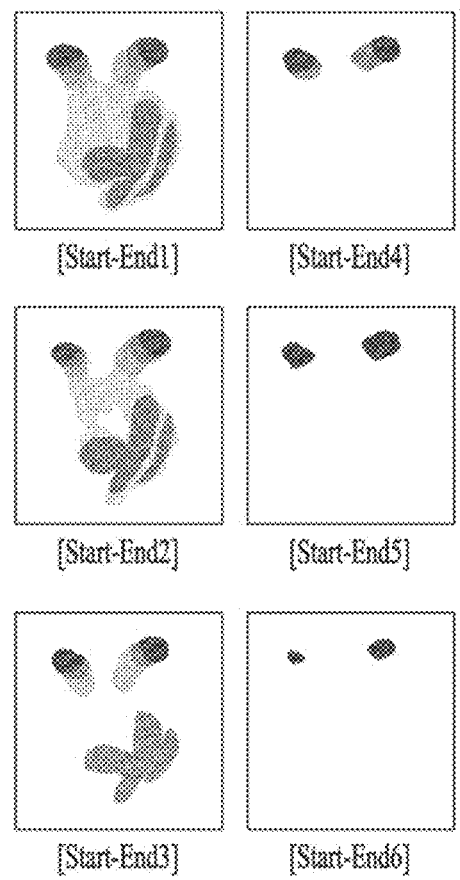

In particular, FIG. 7 is a flow chart illustrating the method of generating the segment tree corresponding to the user's hand in FIG. 4, and FIG. 8 to are diagrams describing FIG. 7. In addition, the mobile terminal can implement a segment tree for the start of tracking when an object enters the interaction region 620 in FIG. 5.

To implement the segment tree, the mobile terminal determines the shortest distance=START and a reference distance=END to obtain the segment. The shortest distance=START may be the distance corresponding to the smallest pixel value 323 except for 0 in FIG. 6. That is, the shortest distance=START may be the distance h1 between the depth camera 200 and a point 411c of the object or the user's hand 410 closest to the depth camera 200 in as illustrated in FIG. 8.

The reference distance=END may be a distance for obtaining a segment. Further, the segment may be a group of pixels having pixel values corresponding to the reference distance=END or smaller. Also, the mobile terminal can determine, as the reference distance=END, a distance greater than the shortest distance=START and smaller than or equal to the first predefined distance 330. As illustrated in FIG. 8, the reference distances=END can be determined sequentially between the first predefined distance h1 and shortest distance h1 and at a predefined distance spacing.

Further, the mobile terminal filters only pixels having pixel values between a pixel value corresponding to the shortest distance=START and a pixel value corresponding to the reference distance=END from the acquired depth image and removes pixel values of the remaining pixels S502.

Next, FIG. 9(a) shows one embodiment of the user's hand captured in the depth image and overlaps the shortest distance=START and a first reference distance=END 1 to a sixth reference distance=END 6 with the user's hand. Further, FIG. 9(b) is a diagram illustrating an embodiment in which only pixels having pixel values between each of pixel values corresponding to the first reference distance=END 1 to sixth reference distance=END 6 and a pixel value corresponding to the shortest distance=START are filtered. When the reference distances END 1 to 6 to the depth camera or the shortest distance=START point becomes smaller, the number of pixels as filtered increases. Thus, the mobile terminal can filter the depth image based on the determined reference distance=END and shortest distance=START and may segment the segment S503

Figure 10:
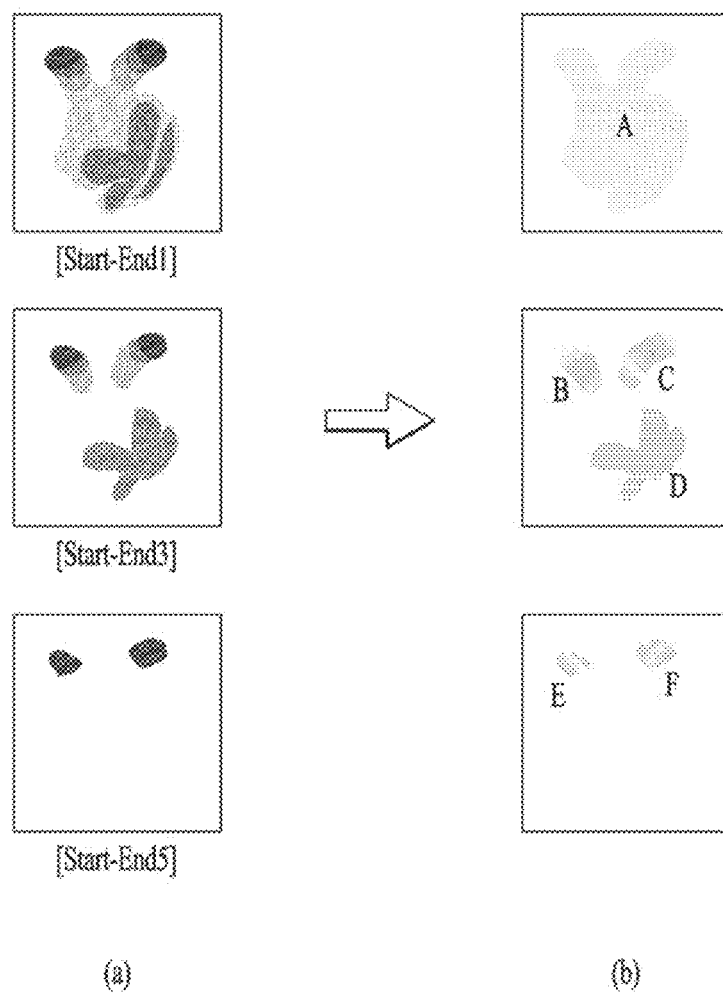

Next, FIG. 10 illustrates the process of segmenting a segment. In particular, FIG. 10(a) shows each of depth images as filtered based on the shortest distance=START and first reference distance=END1, the shortest distance=START and third reference distance=END3, and the shortest distance=START and fifth reference distance=ENDS, respectively in FIG. 9. FIG. 10(b) shows a segment segmented by grouping pixels with pixel values in the filtered image.

Specifically, the depth image as filtered based on the shortest distance=START and the first reference distance=END1 can be segmented into one pixel group. In addition, one pixel group may correspond to a segment A. Further, the depth image as filtered based on the shortest distance=START and the third reference distance=END3 can be segmented into three pixel groups. The three pixel groups may correspond to segments B, C, and D, respectively. Further, the depth image as filtered based on the shortest distance=START and the fifth reference distance=ENDS can be segmented into two pixel groups. The two pixel groups may correspond to segments E and F. Also, the mobile terminal determines a specific segment (=Parent) after segmentation of the segment S504.

Figure 11:
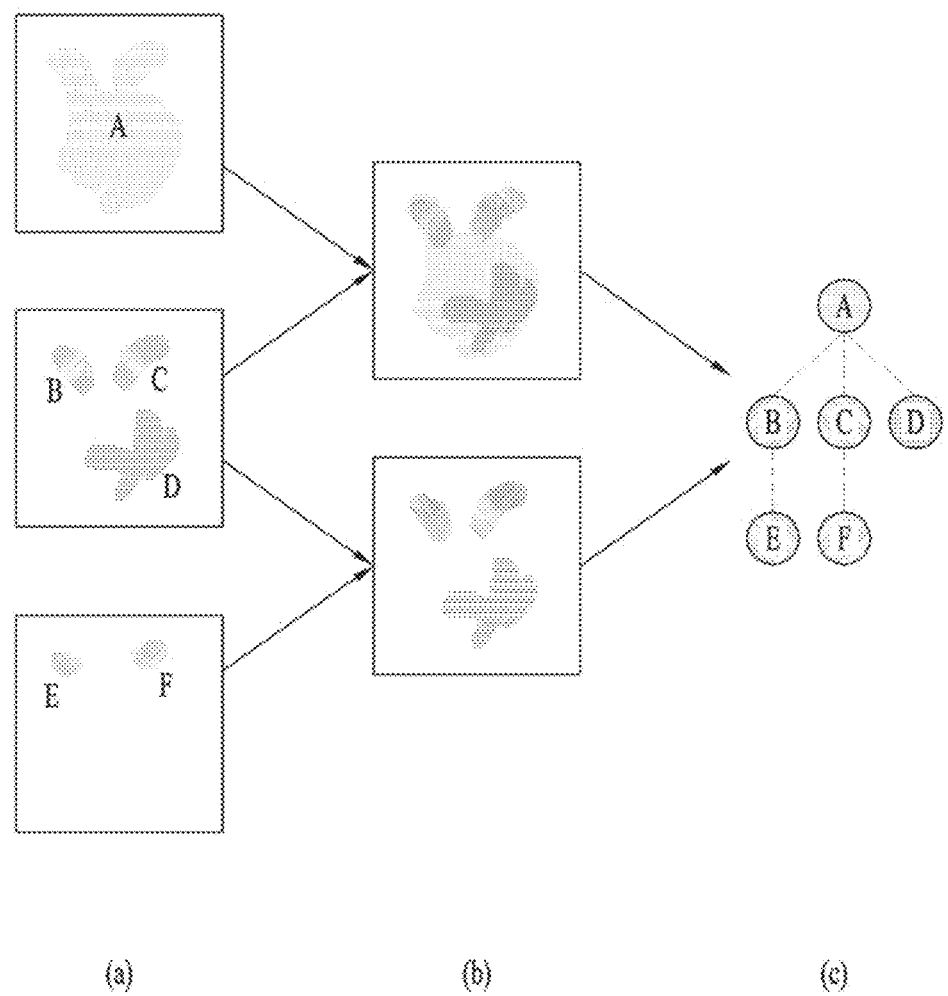

FIG. 11 is diagram illustrating a method of implementing the segment tree using the segmented segments in FIG. 10 and determining the specific segment. In FIG. 11 a, segment A has a corresponding reference distance that is larger than each of reference distances corresponding to the segments B, C, and D. A region of the segment A includes the segments B, C, and D. Those may be compared with each other as shown in an upper diagram of FIG. 11(b). In FIG. 11(a), each of the reference distances corresponding to the segments B, C and D is larger than each of the reference distances to which segments E and F correspond. The segments E and F are included in the regions occupied by the segments B and C, respectively. Those may be compared with each other as shown in a lower diagram of FIG. 11b. Further, top and bottom views of FIG. 11(b) may be implemented into a segment tree, as shown in FIG. 11(c).

Specifically referring to FIG. 11(c), the segment A, the segments B, C, and D, and the segments E and F are respectively positioned at a top, a middle, and a bottom of the segment tree based on the corresponding reference distances. The segment A may include the segments B, C, and D and may be connected to the segments B, C, and D. Further, the segments B and C may include the segments E and F, respectively, and be connected thereto respectively.

That is, the mobile terminal according to the present disclosure can decrease the reference distance in the depth image from the first predefined distance at the predefined spacing, thereby to obtain the corresponding segments and then may form the segment tree using the including relationship between the segments.

Further, the specific segment (=parent) may be a segment including a plurality of segments corresponding to adjacent reference distances. That is, in FIG. 11, the segment A may include the plurality of segments B, C, and D corresponding to adjacent reference distances, and thus may correspond to the specific segment (=parent) according to the present disclosure.

In addition, the mobile terminal sequentially decreases the reference distance=END, at the predefined distance gap, from the first predefined distance h1, thereby to obtain the corresponding segments, as illustrated in FIG. 8. Then, the mobile terminal can determine the specific segment. Then, when the reference distance=END is smaller than or equal to the shortest distance=Start or h1 (S505, YES), the mobile terminal can stop implementing the segment tree S506.

Figure 12:
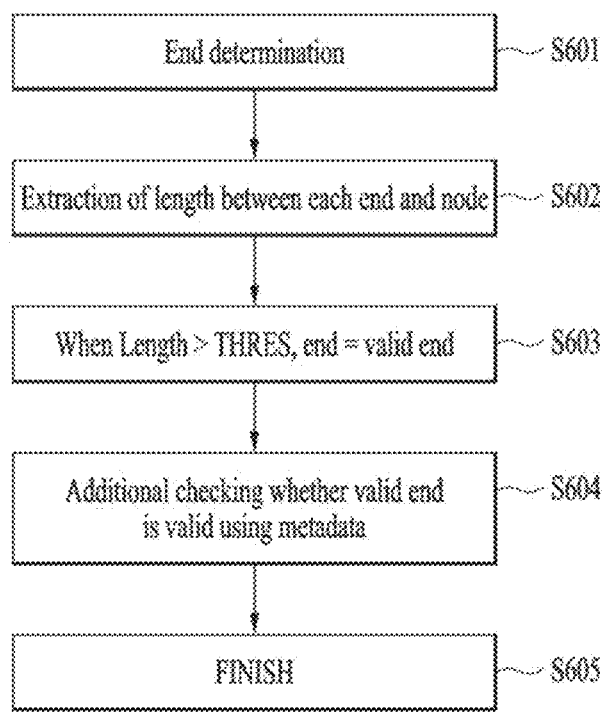
FIG. 12 is a flow chart to illustrate a method of determining a valid end using the segment tree in FIG. 4.
Figure 13:
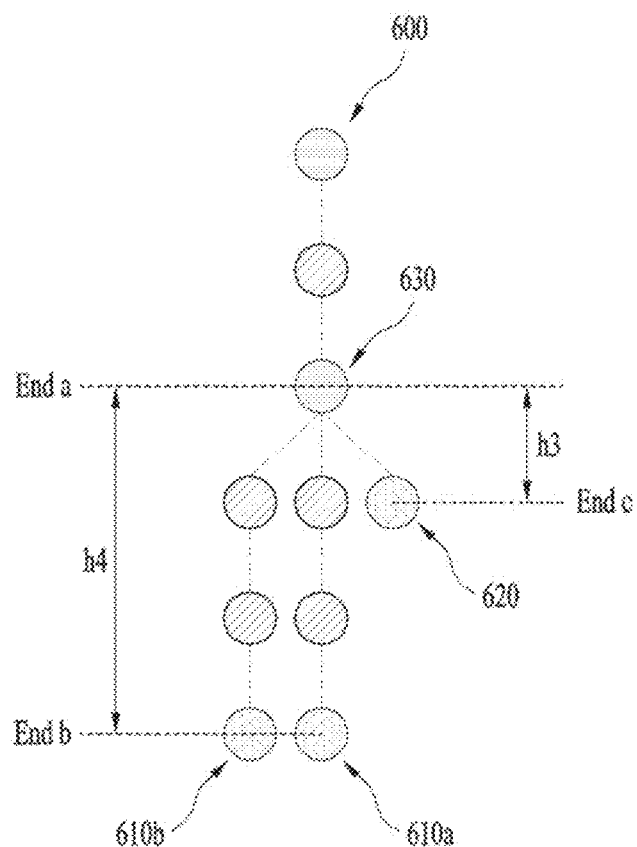
FIG. 13 is a diagram illustrating FIG. 12.

Next, FIG. 12 is a flow chart to illustrate a method of determining the valid end using the segment tree in FIG. 4, and FIG. 13 is a diagram illustrating FIG. 12. When the mobile terminal implements the segment tree using depth data, the mobile terminal can determine an end of the segment tree S601. In this connection, the end may correspond to a target point according to the present disclosure, which will be described in detail with reference to FIGS. 13 and 14.

In addition, the mobile terminal extracts the segment corresponding to the reference distance. When the extracted segment does not include other segments, the corresponding segment can be determined as the end of the segment tree.

FIG. 13 is an example of a segment tree 600, which may be implemented as described with reference with FIGS. 7 to 11. As shown, the segment tree 600 according to the example included in FIG. 13 includes three end 610b, 610a, and 620.

When the mobile terminal determines the end, the mobile terminal can extract a length between each end and the node. Further, the length between each end and the node may be a difference between a reference distance corresponding to each end and a reference distance corresponding to the node. In this connection, the node may correspond to the specific segment in FIG. 11. Also, the segment tree 600 according to the example of FIG. 12 includes one node 630, and the segment tree 600 can be generated by connecting the three end 610a, 610b, and 620 to the node 630.

In addition, the length between each of the ends 610a, 610b, and 620 and the node 630 may be a difference between each of the reference distances End b and End c corresponding to the ends 610a, 610b, and 620, and the reference distance End a corresponding to the node 630. Accordingly, the distance h4 between each of the first end 610a and the second end 610b and the node 630 may be a difference between the reference distance End b corresponding to the first end 610a and the second end 610b and the reference distance End a corresponding to the node 630. Further, the distance h3 between the third end 620 and the node 630 may be a difference between the reference distance End c corresponding to the third end 620 and the reference distance End a corresponding to the node 630.

Further, the mobile terminal determines the valid end based on whether the length between each end and the node is greater than or equal to the second predefined distance S603. That is, the mobile terminal can determine a certain end as a valid end when the certain end is spaced by the second predefined distance or greater from the reference distance corresponding to the node. Referring to FIG. 13, the first end 610a and the second end 610b may be determined as the valid end when the length h4 between each of the first end 610a and the second end 610b and the node 630 is larger than or equal to the predefined distance. Further, when the length h3 between the third end 620 and the node 630 is not larger than or equal to the second predefined distance, the third end 620 may be determined to be an invalid end.

However, the mobile terminal may further check using metadata whether the end determined as the valid end is an invalid end S604. The method for additionally checking using the metadata whether the end determined as the valid end is an invalid end may include checking a size increase rate of the valid end toward the node. In this connection, the valid end can be determined as the invalid end when a size of the valid end suddenly increases from the node. The algorithm terminates when the valid end is determined using the segment tree S605.

Figure 14:
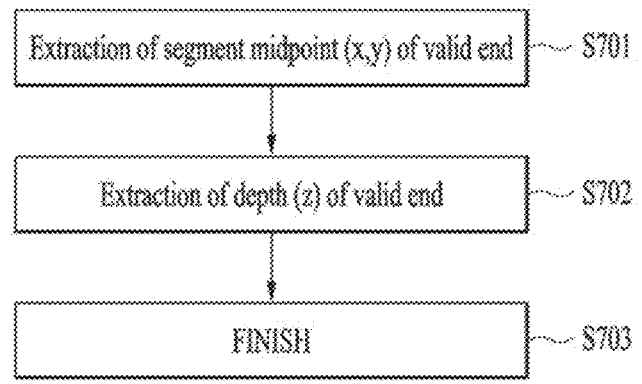
FIG. 14 is a flow chart illustrating a method of extracting a target point and a depth corresponding to the valid end determined in FIG. 4.
Figure 15:
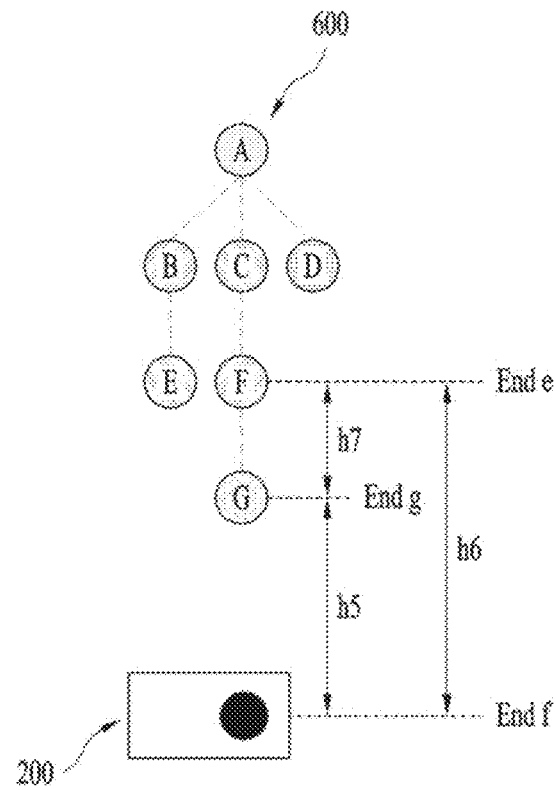
FIG. 15 and FIG. 16 are diagrams describing FIG. 14.
Figure 16:
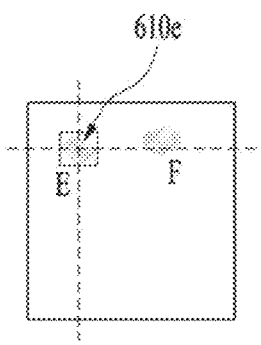

Next, FIG. 14 is a flow chart illustrating a method of extracting the target point and depth corresponding to the valid end determined in FIG. 4, and FIGS. 15 and 16 are diagrams describing FIG. 14. As shown, the mobile terminal extracts a midpoint (x, y) of the segment corresponding to the valid end S701. In more detail, the mobile terminal can extract the midpoint (x, y) of the segment using positions of the pixels that constitutes the segment corresponding to the valid end. The mobile terminal extracts the depth z of the valid end S702. Then, the procedure ends S703.

Next, FIG. 15 is an example of a segment tree 600, which may be implemented as described with reference to FIGS. 7 to 11, where segments E and G are segments corresponding to valid ends. In addition, FIG. 16 shows a depth image obtained at the reference distance End e corresponding to the segments E and F of FIG. 16. The depth image include the segments E and F as filtered.

The segment E in the depth image corresponds to the valid end. The mobile terminal can extract the midpoint (x, y) of the segment E using the position of a pixel group 610e that constitutes the segment E in the depth image. Further, the mobile terminal can extract a depth h6 using the reference distance End e corresponding to the segment E. In this connection, the mobile terminal can extract a depth difference h7 between the segment G and another segment using a depth h5 extracted using a reference distance (End g) corresponding to the segment G.

The mobile terminal uses the midpoint (x, y) and depth (y) corresponding to the valid end to obtain the target point for the user's hand. In this response, the mobile terminal can provide video feedback on the display.

Figure 17:
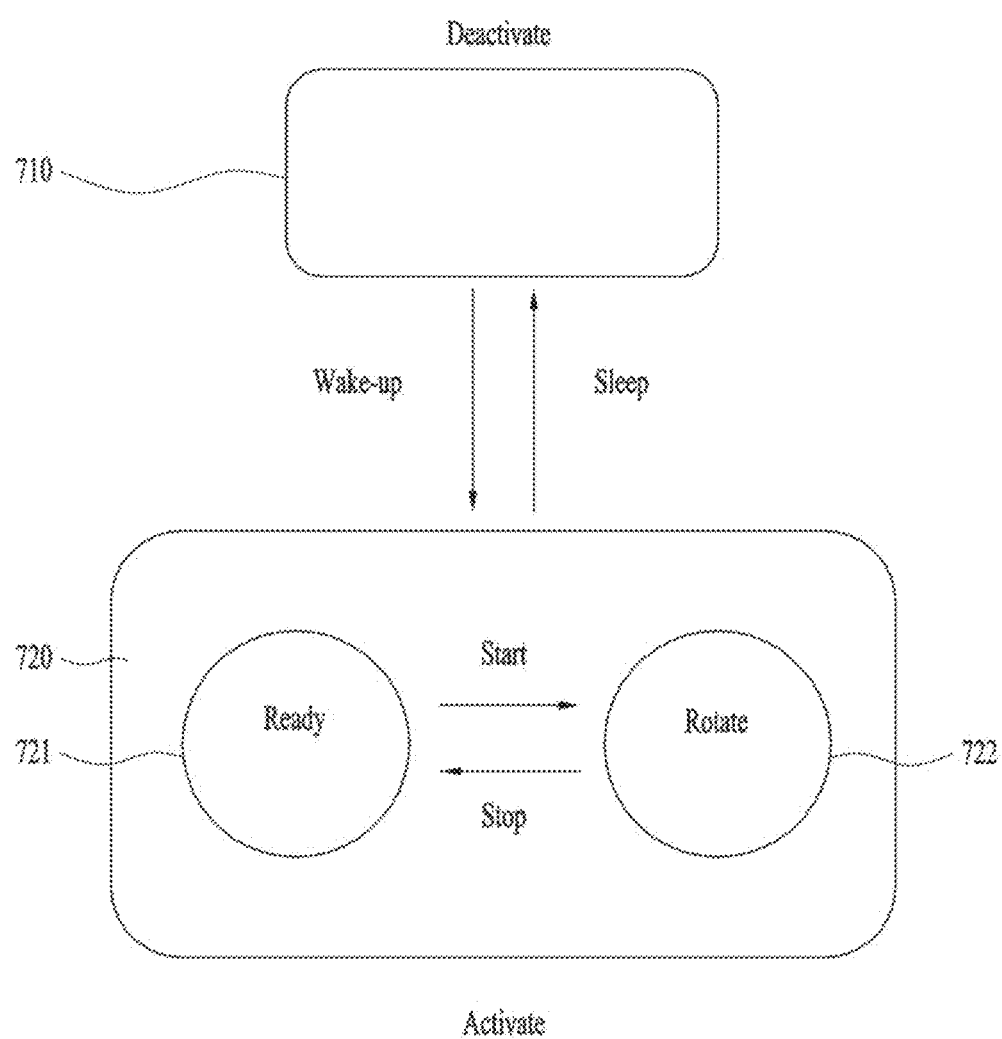
FIG. 17 and FIG. 18 are diagrams illustrating an operation mode change process of the TOF camera.
Figure 18:
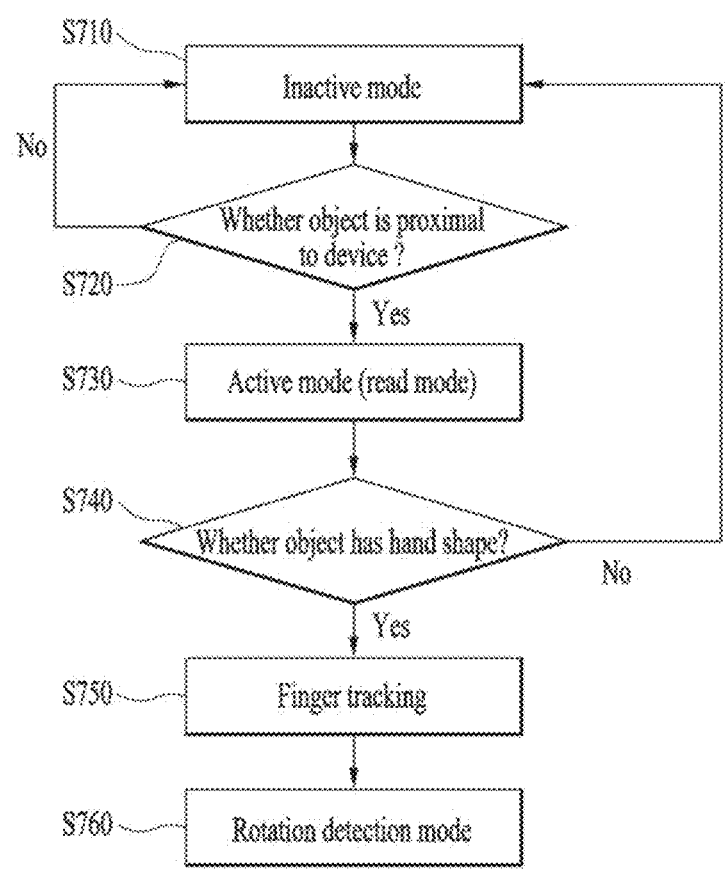

Next, FIGS. 17 and 18 are diagrams illustrating an operation mode change process of the TOF camera. The operation mode of the TOF camera included in the present disclosure includes an inactive mode Deactivate 710 and an active mode Activate 720. The inactive mode 710 is a state in which the TOF camera is tuned off, and the active mode 720 is a state in which the TOF camera is turned on.

When the TOF camera according to the present disclosure does not need to acquire a depth image, the camera can be maintained in an inactive mode 710 state to prevent power consumption. Further, the TOF camera included in the present disclosure can be switched (wake-up) from the inactive mode 710 to the active mode 720 when a predefined condition is satisfied while being in the inactive mode 710. According to the present disclosure, the TOF camera can be switched (wake-up) from the inactive mode 710 to the active mode 720 using a low power sensor such as a proximity sensor in one embodiment.

Specifically, in accordance with the present disclosure, when the object is determined to be proximal to the terminal based on data from the proximity sensor (S720, Yes), the controller can switch the TOF cameras from the inactive mode 710 to the active mode 720 S730. The proximity sensor is a sensor that is always turned on, thereby allowing the controller to keep the TOF camera in the inactive mode 710 when the object is not proximal thereto (S720, No) S710.

According to the present disclosure, the TOF camera can be switched from the active mode 720 to a ready mode 721 or a rotation detection mode 722. The ready mode 721 refers to a mode in which the TOF camera identifies the proximal object using the depth image. When the TOF camera is in the active mode 720, the camera can enter the ready mode 721 S730.

The TOF camera according to the present disclosure identifies whether the proximal object corresponds to the hand, based on the image acquired in the ready mode 721 S740. When the proximal object corresponds to the user's hand (S740, Yes), the mobile terminal can perform a finger tracking to track the finger tip of the user hand S750.

Further, the TOF camera according to the present disclosure identifies whether the proximal object corresponds to the hand based on the image acquired in the ready mode 721

S740. When the proximal object does not correspond to the user's hand (S740, No), the TOF The camera can switch from the active mode 720 to the inactive mode 710 (sleep). In some cases, even when the proximal object corresponds to the user's hand, and when the shape of the user's hand has a predefined shape, the TOF camera can switch from the active mode 720 to the inactive mode 710 (sleep).

According to the present disclosure, the TOF camera can switch from the ready mode 721 to the rotation detection mode 722 S760. The rotation detection mode 722 is a mode for detecting the rotation amount of the user's hand. The mobile terminal in accordance with the present disclosure can rotate the graphic interface provided on the display, control the volume, brightness, etc. based on the rotation amount of the user hand as detected in the rotation detection mode 722.

According to the present disclosure, it is preferable that the TOF camera is switched (Start) to the rotation detection mode 722 when a specific condition is satisfied in the ready mode 721. This is because when the graphic interface provided on the display is rotated even when the user has no intention of the rotating, or the volume and brightness are changed even when the user has no intention of the changing, this may be inconvenient for the user. Similarly, when the specific condition is satisfied in the rotation detection mode 722, the TOF camera according to the present disclosure can be switched (Stop) to the ready mode 721.

Hereinafter, the condition in which the TOF camera according to the present disclosure switches (start) from the ready mode 721 to the rotation detection mode 722 and the condition in which the TOF camera switches (stop) from the rotation detection mode 722 to the ready mode 721 will be described.

Figure 19:
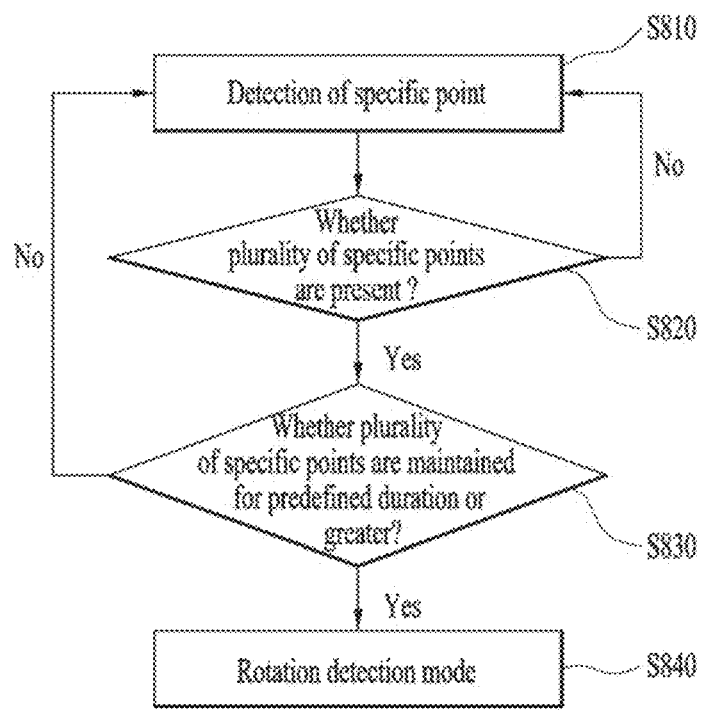
FIG. 19 to FIG. 21 are flow charts illustrating a process of switching a TOF camera from a ready mode to a rotation detection mode according to the present disclosure.
Figure 20:
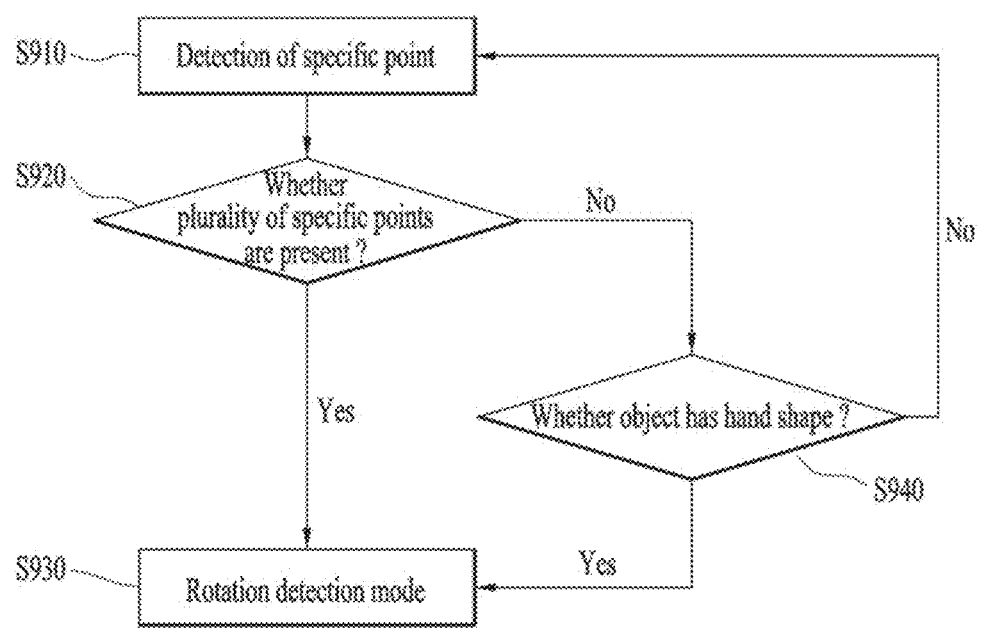

In particular, FIGS. 19 to 20 are flow charts illustrating the process by which the TOF camera switches from the ready mode 721 to the rotation detection mode 722 according to the present disclosure. FIGS. 19 to 20 show different embodiments, respectively.

According to an embodiment of the present disclosure, the process illustrated in FIG. 19 is as follows. The TOF camera according to the present disclosure can acquire a depth image in the ready mode 721 and identify a specific point included in the depth image. In this connection, the specific point may be an end point corresponding to an end in the object included in the depth image S810.

Specifically, the specific point may be a point positioned in a specific region of the imaging region of the TOF camera. In this connection, the specific region may be the interaction region 320 of FIG. 5 for finger tracking.

Further, the specific point may be a point corresponding to an end protruding by a predefined distance or greater from a specific body included in the object toward the mobile terminal. In more detail, the specific point may be a point corresponding to a fingertip protruding by a predefined distance or greater from a palm included in the user hand toward the mobile terminal. For example, the specific point may be a point corresponding to a distal end of a finger extending by at least 3 cm toward the mobile terminal. Referring to FIG. 3, the valid ends 610a and 610b separated from the node 630 by the predefined distance or greater may correspond to specific points.

Further, the specific point may be configured such that an area of an end corresponding to the specific point on a plane facing the TOF camera is within a predefined range. Specifically, FIG. 10(b) shows an area of the user hand on the plane facing the TOF camera based on the depth. A bottom diagram of FIG. 10(b) shows the areas occupied by the valid ends E and F. The valid ends E and F correspond to the ends of fingers extending from the user's hand body toward the mobile terminal. Each of the areas occupied by the valid ends E and F may be within the user's finger cross section range. That is, the specific point according to the present disclosure may be configured such that the area occupied by the corresponding end thereto on the plane facing the TOF camera can be within the finger cross-section area range.

The TOF camera according to the present disclosure can acquires a depth image in the ready mode 721 and identify the number of specific points included in the depth image S820. When there is a singular specific point (S820, No), the TOF camera can continuously identify the specific point.

The TOF camera according to the present disclosure can acquire a depth image in the ready mode 721. When the number of specific points included in the depth image is plural and is greater than or equal to a predefined number THRS (S820, Yes), the TOF camera can measure a time duration for which the specific point is maintained S830.

When the time duration for which the plurality of specific points are maintained is greater than or equal to a predefined time duration (S830, Yes), the TOF camera according to the present disclosure determines that a current state is a stable state for being switched to the rotation detection mode and thus can be switched to the rotation detection mode S840.

When the time duration for which the plurality of specific points are maintained is smaller than the predefined time duration (S830, No), the TOF camera according to the present disclosure determines that a current state is an unstable state for being switched to the rotation detection mode and thus can continuously identify the plurality of specific points S810.

According to another embodiment of the present disclosure, the process shown in FIG. 20 is as follows. The TOF camera according to the present disclosure can acquire a depth image in the ready mode 721 and identify a specific point included in the depth image. In this connection, the specific point may be an end point corresponding to an end in the object included in the depth image S910. Specifically, in this connection, the specific point may correspond to the specific point described in FIG. 19.

The TOF camera according to the present disclosure acquires a depth image on the ready mode 721. When the number of specific points included in the depth image is greater than or equal to the predefined number THRES (S920, Yes), the TOF camera can be switched to the rotation detection mode S930.

Further, the TOF camera according to the present disclosure can acquire a depth image in the ready mode 721 and identify the number of specific points included in the depth image S920. When there is only one specific point (S920, No), the camera can identify whether the user's hand shape included in the depth image corresponds to a predefined hand gesture S940.

When the user's hand shape included in the depth image corresponds to a predefined hand gesture (S940, Yes), the TOF camera according to the present disclosure can be switched to the rotation detection mode (Rotate State) S930. However, when only a single specific point is detected (S920, No), and when the user's hand shape included in the depth image does not correspond to the predefined hand gesture (S940, No), the TOF camera according to the present disclosure can continuously identify the specific point S910.

Figure 21:
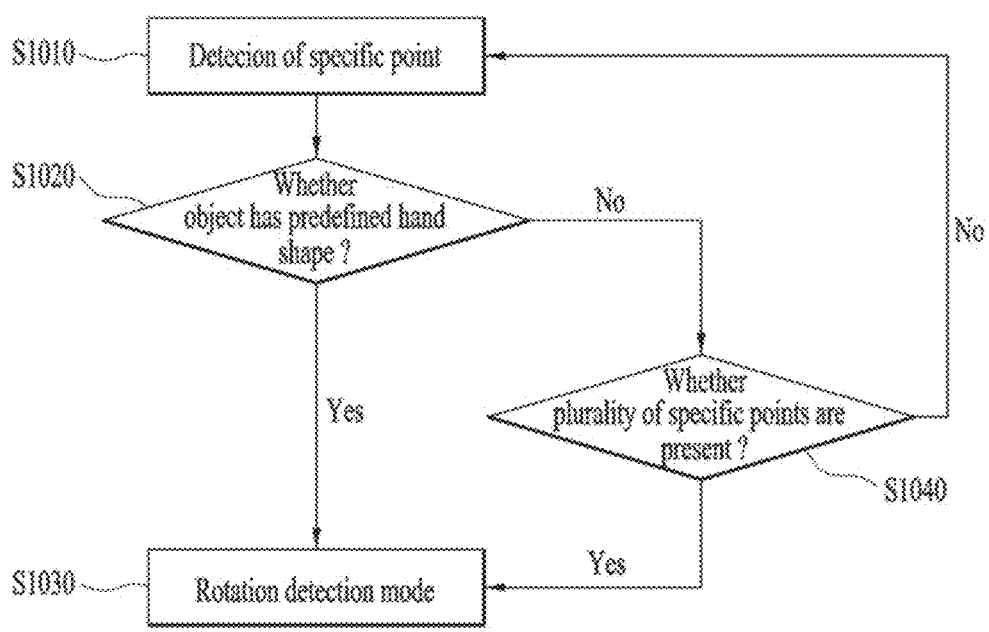

According to another embodiment of the present disclosure, the process shown in FIG. 21 is as follows. The TOF camera according to the present disclosure can acquire a depth image in the ready mode 721, and identify a specific point included in the depth image. In this connection, the specific point may be an end point corresponding to the end in the object included in the depth image S1010. Specifically, in this connection, the specific point may correspond to the specific point as described in FIG. 19.

The TOF camera can identify whether the user's hand shape included in the depth image corresponds to a predefined hand gesture during the process of identifying the specific point S1020. When the user's hand shape included in the depth image corresponds to a predefined hand gesture (S1020, Yes), the TOF camera can be switched to the rotation detection mode (Rotate State) S1030.

When the user's hand shape included in the depth image does not correspond to the predefined hand gesture (S1020, No), the TOF camera can identify whether the number of specific points included in the depth image is plural and is greater than or equal to a predefined number THRS S1040.

When the number of specific points included in the depth image is plural and is greater than or equal to a predefined number THRS (S1040, Yes), the TOF camera according can be switched to the rotation detection mode (Rotate State) S1030. However, when user's hand shape included in the depth image does not correspond to a predefined hand gesture and (S1020, No) and when the number of the specific points is singular (S1040, No), the TOF camera can continuously identify a specific point S1010.

In addition, after the TOF camera switches to the rotation detection mode, the TOF camera can be switched to the ready mode 721 when the camera does not identify an object corresponding to the user's hand shape for a predefined time duration or greater or when the number of specific points is singular.

Figure 22:
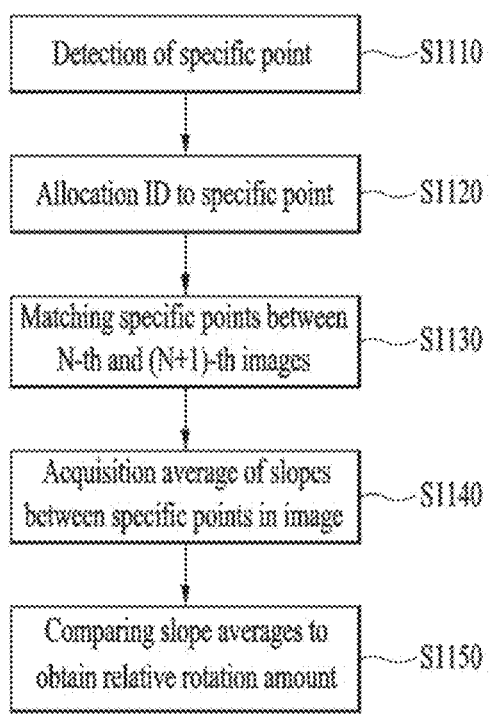
FIG. 22 illustrates a process for obtaining relative rotation amounts of a plurality of specific points from a TOF camera according to the present disclosure.

Hereinafter, a process for detecting a rotation amount using a plurality of specific points in a state in which the TOF camera according to the present disclosure enters the rotation detection mode 722 will be described. In particular, FIG. 22 illustrates a process for obtaining relative rotation amounts of a plurality of specific points by the TOF camera according to the present disclosure.

According to the present disclosure, the TOF camera can continuously identify the specific point in the state that the TOF camera enters the rotation detection mode 722 S1110. In this connection, the specific point may correspond to the specific point as described in FIG. 19.

The controller can assign an ID to each specific point included in the acquired depth image S1120. Specifically, the controller can assign an ID to each of the specific points included in an N-th image and an (N+1)-th image as acquired in succession.

The controller can assign the same ID to the same specific point in the N-th image and the (N+1)-th image and match the specific point included in the N-th image and the specific point included in the (N+1)-th image with each other S1130. A method of matching the specific point included in the N-th image and the specific point included in the (N+1)-th image with each other will be described in detail using FIG. 23.

The controller can extract a specific point including a specific point matching the (N+1)-th image among specific points included in the N-th image. Similarly, the controller mcanay extract a specific point including a specific point matching the N-th image among specific points included in the (N+1)-th image. The controller can obtain an average of slopes between the specific points extracted from the N-th image and obtain an average of slopes between specific points extracted from the (N+1)-th image S1140. In addition, the method for obtaining the average of the slopes between the extracted specific points is described in detail using FIG. 24.

The controller can obtain the relative rotation amount of the plurality of specific points by comparing the slope average between the specific points extracted from the N-th image and the slope average between the specific points extracted from the (N+1)-th image with each other S1150.

Figure 23:
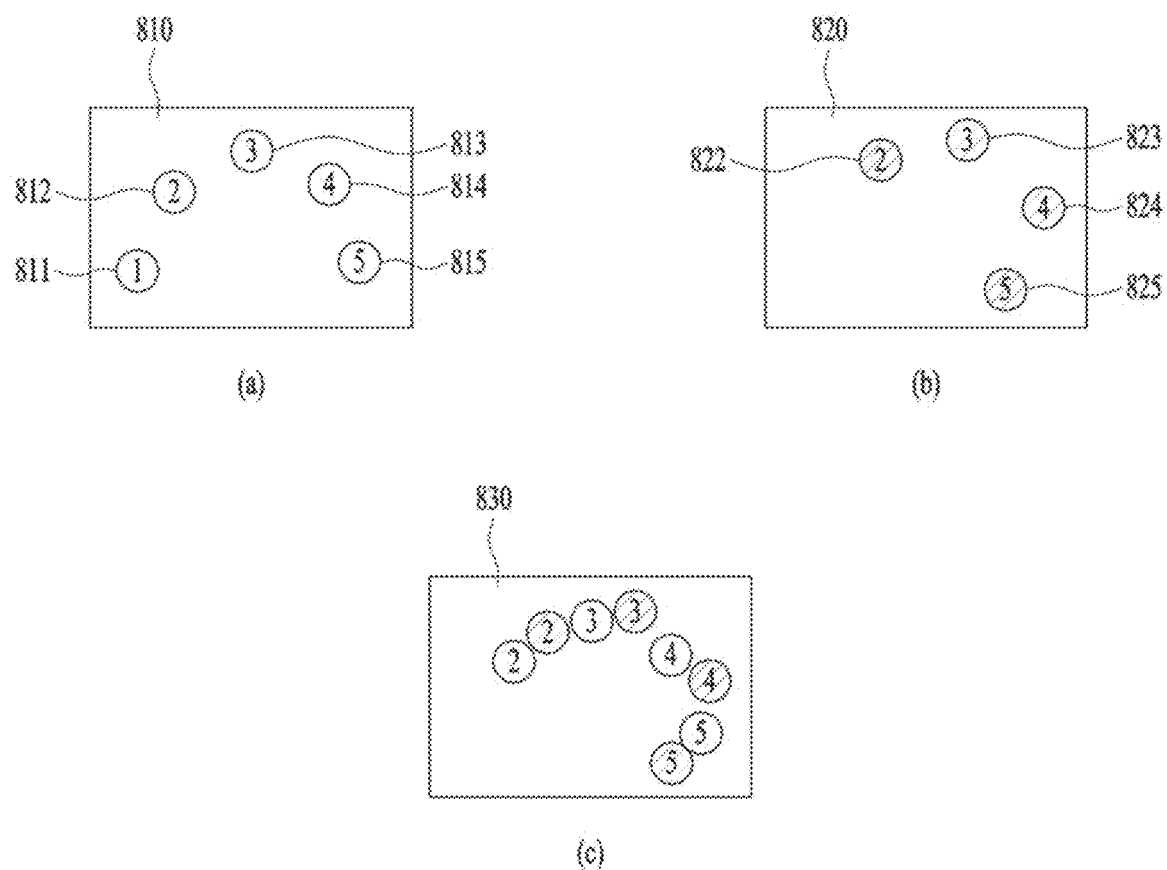
FIG. 23 illustrates a process for matching a specific point included in an N-th image obtained from the TOF camera and a specific point included in an (N+1)-th image obtained from the TOP camera according to the present disclosure.

Next, FIG. 23 illustrates a process for matching a specific point included in an N-th image obtained by a TOF camera according to the present disclosure and a specific point included in an (N+1)-th image obtained by a TOF camera according to the present disclosure with each other. Specifically, FIG. 23(a) shows the N-th image 810 acquired by the TOF camera in the rotation detection mode 722, and FIG. 23(b) shows the (N+1)-th image 820 acquired by the TOF camera according to the present disclosure in the rotation detection mode 722. Also, FIG. 23(c) shows a comparison image 830 comparing the N-th image 810 and the (N+1)-th image 820 with each other.

In addition, the N-th image 810 and the (N+1)-th image 820 may include a plurality of specific points 811 to 815 and a plurality of specific points 822 to 825, respectively. Further, the controller assigns IDs to specific points 811 to 815 included in the N-th image 810, respectively. The IDs may be assigned to specific points 822 to 825 included in the (N+1)-th image 820, respectively. When the controller assigns IDs to the specific points 822 to 825 included in the (N+1)-th image 820, the same IDs assigned to the specific points 811 to 815 included in the N-th image 810 may be assigned to specific points in the (N+1)-th image 820 matching the specific points 811 to 815 included in the N-th image 810.

The controller can match the specific points 812 to 815 included in the N-th image 810 with the specific points 822 to 825 included in the (N+1)-th image 820 based on the distances between the specific points 811 to 815 included in the N-th image 810 and the distances between the specific points 822 to 825 included in the (N+1)-th image 820. In addition, the controller can match the specific points 812 to 815 included in the N-th image 810 with the specific points 822 to 825 included in the (N+1)-th image 820 based on moving distances of the specific points 811 to 815 included in the N-th image 810 and the specific points 822 to 825 included in the (N+1)-th image 820.

Further, the specific points 811 to 815 and 822 to 825 according to the present disclosure correspond to ends that protrude by the predefined distance or greater from the specific body toward the mobile terminal. The controller can match the specific points 812 to 815 included in the N-th image 810 with the specific points 822 to 825 included in the (N+1)-th image 820 based on the protrusion lengths of the specific points 811 to 815 included in the N-th image 810 and the protrusion lengths of the specific points 822 to 825 included in the (N+1)-th image 820. Specifically, the protrusion length may correspond to the length from the node 630 to each of the valid ends 610a and 610b in FIG. 3.

The controller can match the specific points 812 to 815 included in the N-th image 810 with the specific points 822 to 825 included in the (N+1)-th image 820 based on the areas occupied by the ends corresponding to the specific points 811 to 815 included in the N-th image and the areas occupied by the ends corresponding to the specific points 822 to 825 included in the (N+1)-th image. In this connection, the area occupied by the end corresponding to the specific point may correspond to the area occupied by each of the segments E and F in FIG. 10b.

An embodiment of matching the specific points based on the above matching schemes will be described in details with reference to FIG. 23 as follows. The controller can assign IDs to the specific points 811 to 815 included in the N-th image 810, respectively. The controller can identify the specific points 822 to 825 in the (N+1)-th image 820 as obtained and then assign IDs thereto. When the controller assigns IDs to the specific points 822 to 825 included in the (N+1)-th image 820, the same IDs assigned to the specific points 811 to 815 included in the N-th image 810 may be assigned to specific points in the (N+1)-th image 820 matching the specific points 811 to 815 included in the N-th image 810. Further, the first specific point 811 included in the N-th image 810 may not be included in the (N+1)-th image 820. Also, the remaining specific points 812 to 815 included in the N-th image 810 may have the same ID corresponding to the specific points 822 to 825 of the (N+1)-th image 820, respectively. In some cases, the (N+1)-th image 820 may include a specific point that does not match a specific point in the N-th image 810.

Specifically, FIG. 23(c) shows a comparison image 830 in which the specific points 812 to 815 and 822 to 825 matching between the N-th image 810 and the N+1-th image 820 are extracted and are compared with each other. Referring to the comparison image 830, it may be seen that the specific points 822 to 825 of the (N+1)-th image 820 are rotated relative to the specific points 812 to 815 of the N-th image 810. Hereinafter, a method for obtaining a relative rotation amount between the extracted specific points 812 to 815 and 822 to 825 will be described.

Figure 24:
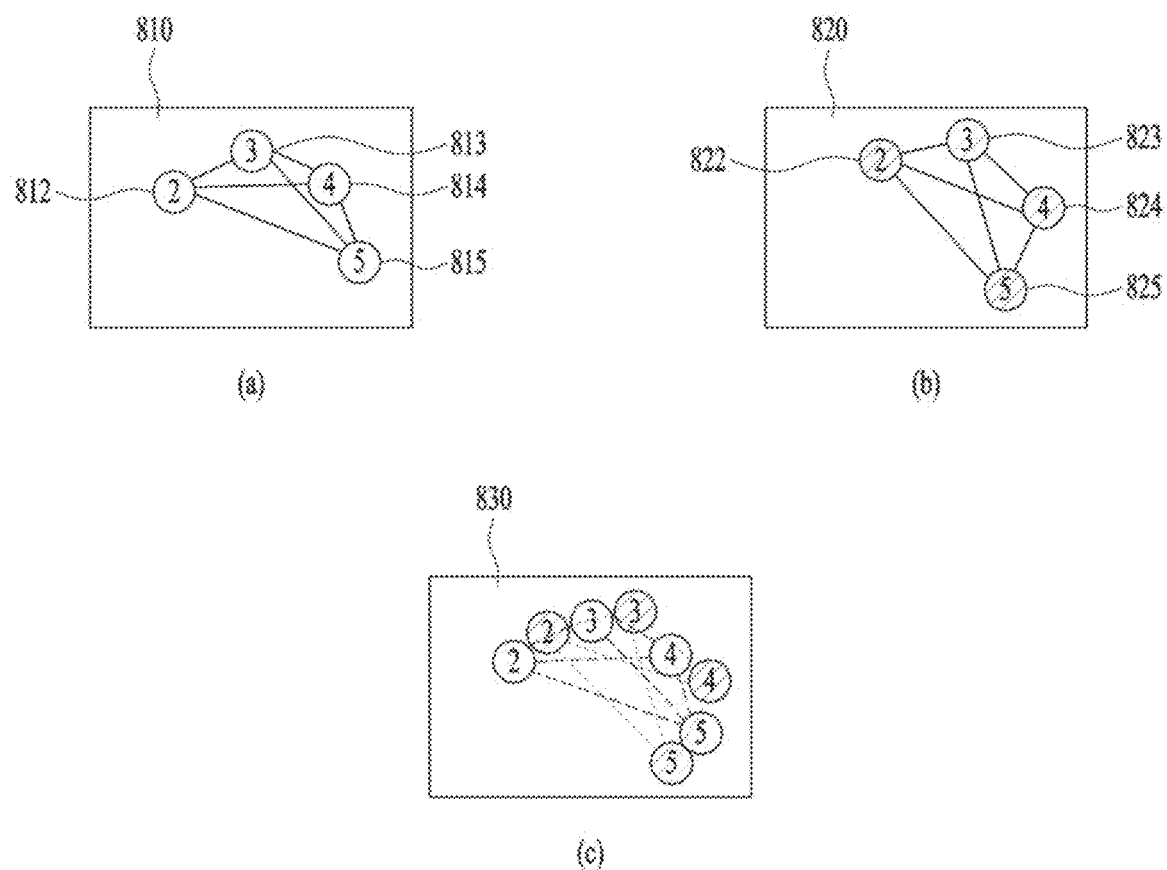
FIG. 24 illustrates a method for obtaining a relative rotation amount between the specific point extracted from the N-th image acquired from the TOF camera and the specific point extracted from the (N+1)-th image acquired from the TOF camera according to the present disclosure.

In particular, FIG. 24 illustrates a method for obtaining the relative rotation amount between the specific points extracted from the N-th image acquired by the TOF camera and the specific points extracted from the (N+1)-th image acquired by the TOF camera according to the present disclosure. The controller can find slopes of straight lines interconnecting the specific points 812 to 815 extracted from the N-th image 810 and average the slopes to obtain an average slope. Similarly, the controller can find slopes of straight lines interconnecting the specific points 822 to 825 extracted from the (N+1)-th image 820 and average the slopes to obtain an average slope.

Further, the controller can obtain the relative rotation amount of the specific points using the average slope of the specific points 812 to 815 extracted from the N-th image 810 and the average slope of the specific points 822 to 825 extracted from the (N+1)-th image 820. In this connection, the relative rotation amount can be obtained on the first plane facing the TOF camera. Further, the relative rotation amount can be obtained on a second plane perpendicular to the first plane. For example, the relative rotation amount can be obtained on the first plane using only the x and y coordinates of the specific point. The relative rotation amount on the second plane can be obtained using the x and z coordinates or y and z coordinates of the specific point.

The controller can obtain a relative rotational velocity using the obtained relative rotation amount and the time difference between the N-th image 810 and (N+1)-th image 820. The controller obtains the relative rotation amounts of the multiple specific points in the rotation detection mode, and then rotates the graphic interface shown on the display based on the obtained relative rotation amount. A detailed embodiment thereof will be described below.

Next, FIGS. 25 to 28 respectively show embodiments of the present disclosure in which the TOF camera obtains the relative rotation amounts of multiple specific points in a rotation detection mode, and a graphic interface displayed on a display is rotated based on the obtained relative rotation amounts.

Figure 25:
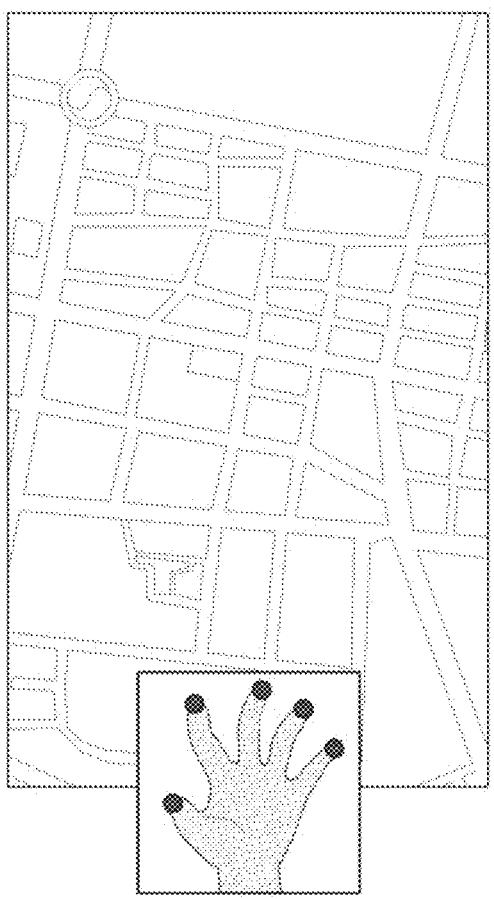
FIG. 25 to FIG. 28 show respectively embodiments of the present disclosure in which the TOF camera obtains the relative rotation amounts of multiple specific points in a rotation detection mode, and a graphic interface displayed on a display is rotated based on the obtained relative rotation amounts.
Figure 25:
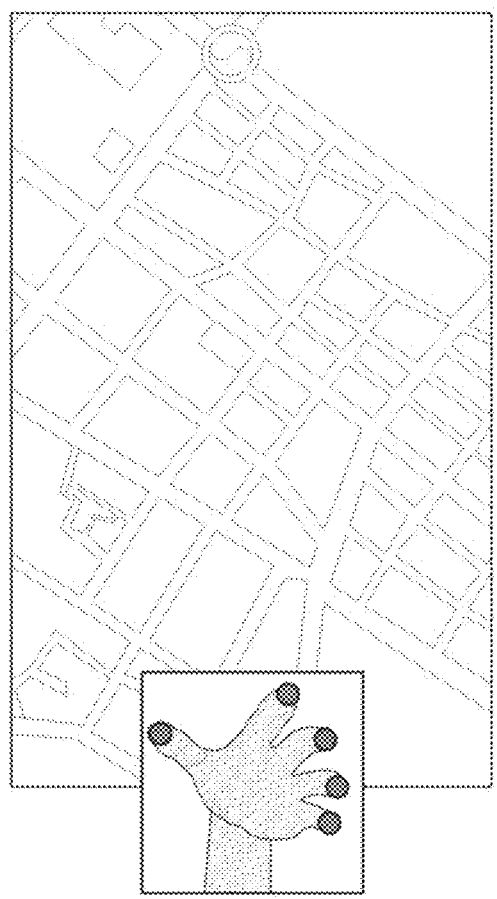
Figure 26:
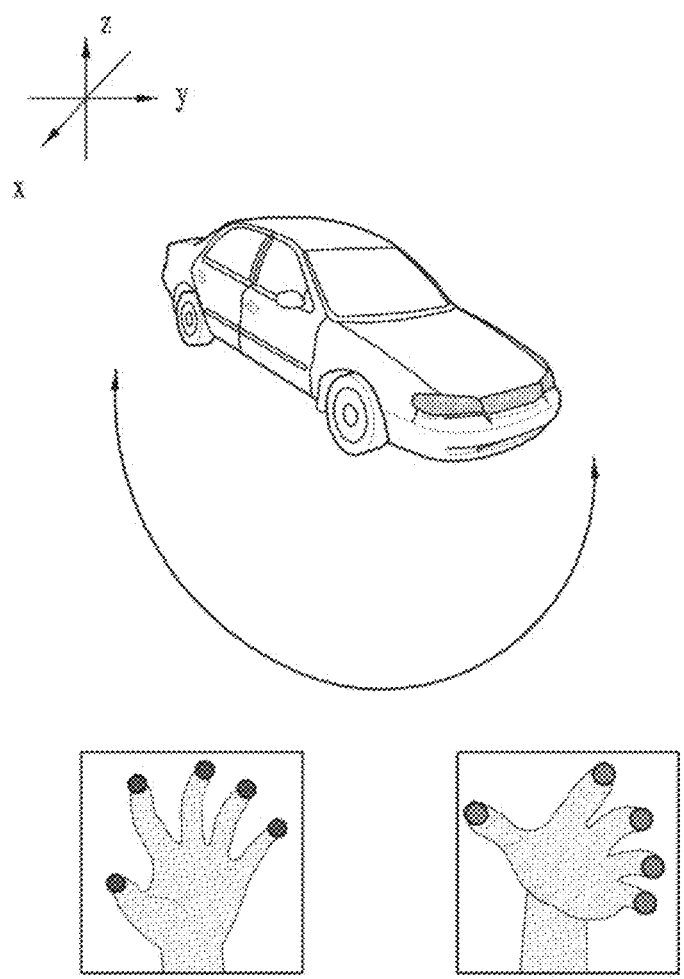
Figure 27:
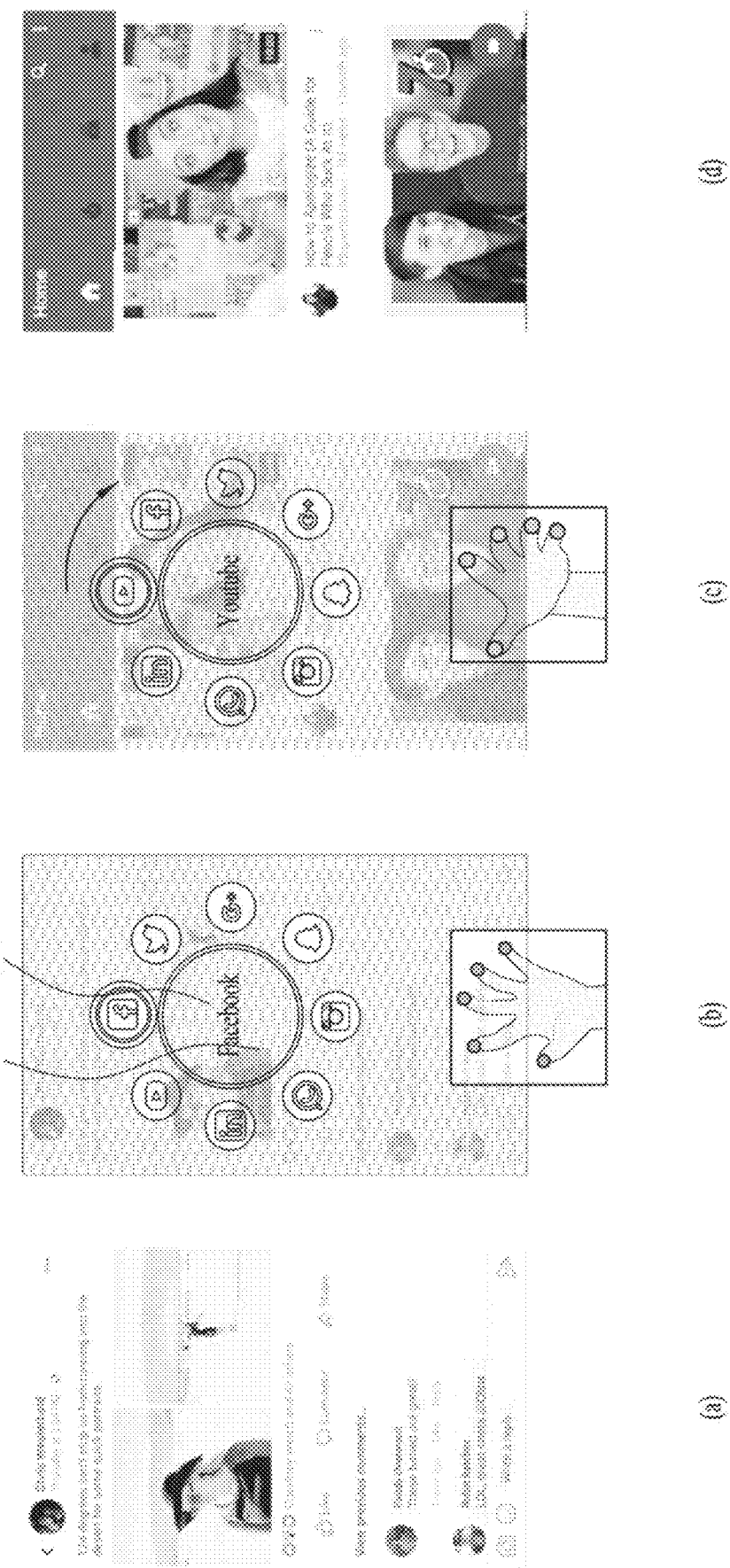
Figure 28:
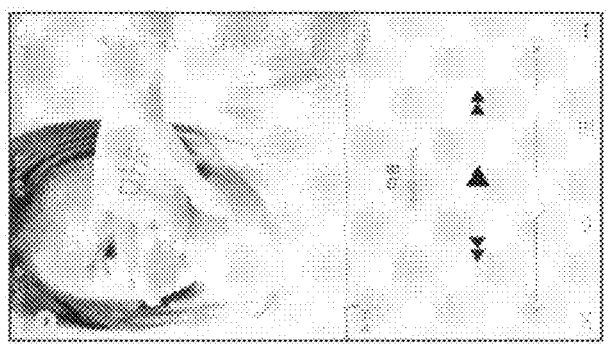
Figure 28:
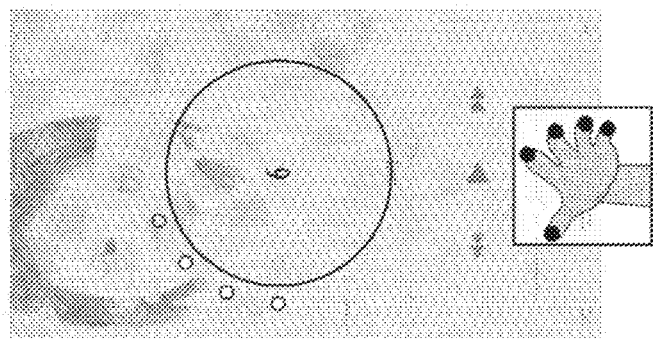
Figure 28:
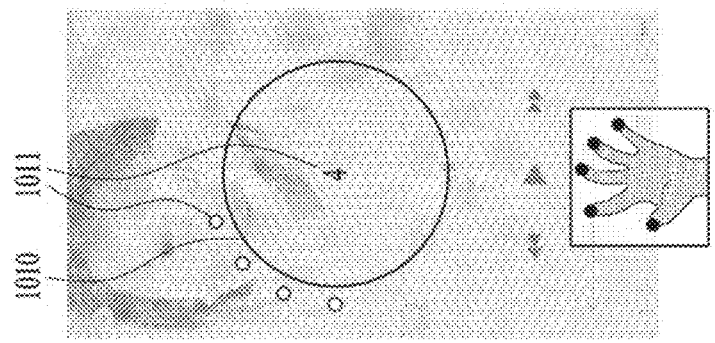
Figure 28:

In more detail, the graphic interface according to the present disclosure can include a 2D image or a 3D image that rotates based on the relative rotation amount of a plurality of specific points. Specifically, FIG. 25 shows an embodiment corresponding to a map whose graphic interface is a 2D image. When the controller rotates the 2D image, the relative rotation amount of the plurality of specific points may correspond to a relative rotation amount on a plane facing the TOF camera (for example, an xy plane). Further, FIG. 26 shows an embodiment corresponding to an automobile whose graphic interface is based on a 3D image. When rotating the 3D image, the relative rotation amount of the plurality of specific points may correspond to a relative rotation amount on a plane facing the TOF camera (for example, an xy plane) and a plane perpendicular thereto (for example, the xz and yz planes).

The graphic interface according to the present disclosure can provide an application selected based on the relative rotation amount of the plurality of specific points. Further, the controller can provide a graphical interface when the camera is switched to the rotation detection mode. Specifically, FIG. 27(a) shows a screen of the display in the ready mode, and FIG. 27(b) shows an embodiment where the graphic interface 910 is shown on the display when the TOF camera is switched to the rotation detection mode. Further, FIG. 27(c) shows an embodiment that the TOF camera senses the relative rotation amount of a plurality of specific points, and then the controller rotates the graphic interface based on the relative rotation amount, and the display displays an application 911 selected based on the relative rotation amount. Also, FIG. 27(d) shows an example of rotating the graphic interface and displaying a screen corresponding to an application 911 selected based on the rotation on the display.

In addition, the graphic interface according to the present disclosure can be an interface that provides a function of fast forwarding, moving to next content, adjusting brightness or adjusting volume based on the relative rotation amount of the plurality of specific points. Specifically, FIG. 28(a) shows a screen of the display in the ready mode, and FIG. 28(b) shows an example where the graphic interface 1010 for volume control is shown on the display when the TOF camera is switched to the rotation detection mode. Further, FIG. 28c shows an example where the relative rotation amount of a plurality of specific points is sensed by the TOF camera, the graphic interface rotates based on the amount, and then the volume changes based on the amount. The magnitude of the volume may be indicated using an indicator 1011 which indicates the volume on the graphic interface 1010. FIG. 28(d) shows an embodiment in which the TOF camera is changed to the ready mode after the volume change is completed.

The above detailed description should not be construed as limiting in all respects, but should be considered as illustrative. The scope of the present disclosure should be determined by reasonable interpretation of the appended claims. All changes within the equivalence range according to the present disclosure are included in a range under the present disclosure.

What is claimed is:

1. A mobile terminal comprising:
a display configured to display a rotatable graphic interface;

a Time of Flight (TOF) camera configured to obtain a depth image of an object; and
a controller configured to:
control the TOF camera to enter a rotation detection mode based on the object included the depth image,
obtain a relative rotation amount of a plurality of specific points of the object included in the depth image, and
rotate the graphic interface on the display based on the obtained relative rotation amount,
wherein when the TOF camera enters the rotation detection mode, the controller is further configured to:
match specific points of an N-th image with specific points of an (N+1)-th image,
calculate a first average of slopes between the matched specific points of the N-th image and a second average of slopes between the matched specific points of the (N+1)-th image, and
calculate the relative rotation amount based on the first and second averages.

2. The mobile terminal of claim 1, wherein the controller controls the TOF camera to enter the rotation detection mode when the plurality of specific points are included in the depth image.

3. The mobile terminal of claim 2, wherein each of the specific points is positioned in a specific region of an imaging region of the TOF camera.

4. The mobile terminal of claim 2, wherein each of the specific points corresponds to an end protruding by a predefined distance or greater from a portion of the object towards the mobile terminal.

5. The mobile terminal of claim 4, wherein each of the specific points has an end whose an area on a plane facing the TOF camera is within a predefined range.

6. The mobile terminal of claim 2, wherein the controller controls the TOF camera to enter the rotation detection mode when the plurality of specific points are maintained in the depth image for a predefined time duration or greater.

7. The mobile terminal of claim 1, wherein each of the specific points corresponds to a distal end point of a finger of a user's hand.

8. The mobile terminal of claim 7, wherein the controller controls the TOF camera to enter the rotation detection mode when the user's hand has a predefined shape.

9. The mobile terminal of claim 1, wherein when the TOF camera enters the rotation detection mode, the controller is further configured to display the rotatable graphic interface on the display.

10. The mobile terminal of claim 1, wherein the controller is further configured to match specific points of the N-th image with specific points of the (N+1)-th image based on distances between the specific points included in the N-th image and distances between the specific points included in the (N+1)-th image.

11. The mobile terminal of claim 1, wherein the controller is further configured to match specific points of the N-th image with specific points of the (N+1)-th image based on moving distances of the specific point included in the N-th image and the specific point included in the (N+1)-th image.

12. The mobile terminal of claim 1, wherein the specific point corresponds to an end protruding by a predefined length or greater from a specific body towards the mobile terminal, and
wherein the controller is further configured to match specific points of the N-th image with specific points of the (N+1)-th image based on protrusion lengths of the specific points included in the N-th image and protrusion lengths of the specific points included in the (N+1)-th image.

13. The mobile terminal of claim 12, wherein the controller is further configured to match specific points of the N-th image with specific points of the (N+1)-th image based on areas of ends corresponding to the specific points included in the N-th image and areas of ends corresponding to the specific points included in the (N+1)-th image.

14. The mobile terminal of claim 1, wherein the controller is further configured to obtain the relative rotation amount on a first plane facing the TOF camera.

15. The mobile terminal of claim 14, wherein the controller is further configured to obtain the relative rotation amount on a second plane perpendicular to the first plane.

16. The mobile terminal of claim 1, wherein the controller is further configured to obtain a relative rotation velocity based on the relative rotation amount and a time difference between the N-th image and the (N+1)-th image.

17. The mobile terminal of claim 1, wherein the graphic interface contains a 2D image or a 3D image rotating based on the relative rotation amount.

18. The mobile terminal of claim 1, wherein the graphic interface provides an application to be selected based on the relative rotation amount.

19. The mobile terminal of claim 1, wherein the graphic interface provides fast forward, next content playback, brightness control, and volume control based on the relative rotation amount.

20. A mobile terminal comprising:
a display configured to display a graphical object;
a Time of Flight (TOF) camera configured to obtain a depth image of a user's hand spaced a predetermined distance from the display; and
a controller configured to:
control the TOF camera to enter a rotation detection mode based on the user's hand being maintained at the predetermined distance from the display for a predefined time duration or greater,
display a rotatable graphical interface on the display for rotating the graphical object in response to the user's hand being maintained at the predetermined distance from the display for the predetermined time duration or greater,
obtain a relative rotation amount of a plurality of distal end points of fingers of the user's hand included in the depth image and that is spaced the predetermined distance from the display, and
rotate the graphical object on the display based on the obtained relative rotation amount of the user's hand.

21. A mobile terminal comprising:
a display configured to display a graphical object without displaying a graphical interface for rotating the graphical object;
a Time of Flight (TOF) camera configured to obtain a depth image of a user's hand spaced a predetermined distance from the display; and
a controller configured to:
control the TOF camera to enter a rotation detection mode based on the user's hand being maintained at the predetermined distance from the display for a predefined time duration or greater,
obtain a relative rotation amount of a plurality of distal end points of fingers of the user's hand included in the depth image and that is spaced the predetermined distance from the display, and rotate the graphical object on the display based on the obtained relative rotation amount of the user's hand without displaying the graphical interface for rotating the graphical object.

\* \* \* \* \*